(12) United States Patent
Kang et al.

(10) Patent No.: US 10,856,273 B2
(45) Date of Patent: Dec. 1, 2020

(54) METHOD FOR MEASURING AND REPORTING CHANNEL STATE INFORMATION IN WIRELESS COMMUNICATION SYSTEM AND DEVICE THEREFOR

(71) Applicant: LG Electronics Inc., Seoul (KR)

(72) Inventors: Jiwon Kang, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/578,066

(22) Filed: Sep. 20, 2019

(65) Prior Publication Data

US 2020/0015228 A1   Jan. 9, 2020

Related U.S. Application Data

(63) Continuation of application No. PCT/KR2018/001998, filed on Feb. 19, 2018.
(Continued)

(51) Int. Cl.
*H04W 72/04* (2009.01)
*H04B 7/0417* (2017.01)
(Continued)

(52) U.S. Cl.
CPC ...... *H04W 72/0413* (2013.01); *H04B 7/0417* (2013.01); *H04B 7/0626* (2013.01);
(Continued)

(58) Field of Classification Search
None
See application file for complete search history.

(56) References Cited

U.S. PATENT DOCUMENTS

2015/0003362 A1   1/2015   Inoue et al.
2016/0105817 A1*  4/2016   Frenne .................. H04B 7/0626
                                                    370/252
(Continued)

FOREIGN PATENT DOCUMENTS

EP        3579479        12/2019
KR    20150039746        4/2015
(Continued)

OTHER PUBLICATIONS

Ericsson, "CSI reporting configurations," R1-1702681, GPP TSG-RAN WG1 #88, Athens, Greece, Feb. 13-17, 2017, 6 pages.
(Continued)

*Primary Examiner* — Kodzovi Acolatse
(74) *Attorney, Agent, or Firm* — Fish & Richardson P.C.

(57) ABSTRACT

The present disclosure provides a method and an apparatus for measuring and reporting channel state information (CSI) in a wireless communication system. Specifically, a method for reporting CSI by a terminal in a wireless communication system comprises: a step of receiving CSI reporting setting information related to CSI reporting; a step of receiving one or more CSI-reference signals (CSI-RSs); and performing the CSI reporting by using a measurement value estimated by at least one specific CSI-RS among the one or more CSI-RSs, wherein the CSI reporting setting information includes gap information for setting a measurement gap for estimating the measurement value, and the at least one specific CSI-RS can be determined on the basis of the gap information and the time point of performing the CSI reporting.

18 Claims, 12 Drawing Sheets

Related U.S. Application Data

(60) Provisional application No. 62/474,590, filed on Mar. 21, 2017.

(51) Int. Cl.
  *H04B 7/06* (2006.01)
  *H04W 24/10* (2009.01)

(52) U.S. Cl.
  CPC ......... *H04W 24/10* (2013.01); *H04W 72/042* (2013.01); *H04W 72/0446* (2013.01)

(56) References Cited

U.S. PATENT DOCUMENTS

| | | | | |
|---|---|---|---|---|
| 2017/0311311 | A1* | 10/2017 | Frenne | H04W 24/10 |
| 2018/0062724 | A1* | 3/2018 | Onggosanusi | H04B 7/0478 |
| 2018/0219606 | A1* | 8/2018 | Ng | H04B 7/0617 |
| 2019/0222279 | A1* | 7/2019 | Xi | H04B 7/024 |
| 2019/0335474 | A1* | 10/2019 | Tang | H04L 5/005 |

FOREIGN PATENT DOCUMENTS

| | | |
|---|---|---|
| WO | WO2015084094 | 6/2015 |
| WO | WO2016018054 | 2/2016 |
| WO | WO2017026873 | 2/2017 |
| WO | WO2018129311 | 7/2018 |
| WO | WO2018142380 | 8/2018 |

OTHER PUBLICATIONS

Huawei, HiSilicon, "Considerations on two-level configuration of CSI acquisition settings," R1-1700057, 3GPP TSG RAN WG1 NR Ad Hoc Meeting, Spokane, USA, dated Jan. 16-20, 2017, 5 pages.

Samsung, "Discussions on periodic and semi-persistent CSI reporting for NR," R1-1702944, 3GPP TSG RAN WG1 Meeting #88, Athens, Greece, dated Feb. 13-17, 2017, 6 pages.

Huawei, HiSilicon, "Considerations on two-level configuration of CSI acquisition settings," R1-1701682, 3GPP TSG RAN WG1 Meeting #88, Athens, Greece, dated Feb. 13-17, 2017, 5 pages.

LG Electronics, "Discussion on CSI framework for NR," R1-1702455, 3GPP TSG RAN WG1 Meeting #88, Athens, Greece, dated Feb. 13-17, 2017, 6 pages.

Samsung, "Discussions on periodic and semi-persistent CSI reporting for NR," R1-1700919, 3GPP TSG RAN WG1 #87, Spokane, USA, dated Jan. 16-20, 2017, 6 pages.

ZTE, ZTE Microelectronics, "On Rs and Csi report settings," R1-1700128, 3GPP TSG RAN WG1 NR Ad-Hoc Meeting, Spokane, U.S.A., dated Jan. 16-20, 2017, 6 pages.

Ericsson, "CSI Framework," R1-1702679, 3GPP TSG-RAN WG1 #88, Athens, Greece, $13^{th}$ -$17^{th}$ Feb., 2017, 7 pages.

Extended European Search Report in European Appln. No. 18770712. 0, dated Aug. 13, 2020, 27 pages.

Huawei, HiSilicon, "On the need for more flexible configurations related to Csi reporting," 81- 1611237, 3GPP Tsg Ran WG1 Meeting #87, Reno, Usa, 14'h-18'h Nov. 2016, 6 pages.

Qualcomm Incorporated, "Details of CSI framework," R1-1702609, 3GPP TSG RAN WG1 #88, Athens, Greece, Feb. $13^{th}$ -$17^{th}$ 2017, 5 pages.

* cited by examiner

METHOD FOR MEASURING AND REPORTING CHANNEL STATE INFORMATION IN WIRELESS COMMUNICATION SYSTEM AND DEVICE THEREFOR

CROSS-REFERENCE TO RELATED APPLICATION

This application is a continuation of International Application No. PCT/KR2018/001998, filed on Feb. 19, 2018, which claims the benefit of U.S. Provisional Application No. 62/474,590, filed on Mar. 21, 2017. The contents of which are all hereby incorporated by reference herein in their entirety.

TECHNICAL FIELD

The present disclosure relates to a wireless communication system, and more particularly, to a method for measuring and reporting channel state information (CSI) and a device for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An embodiment of the present disclosure provides a method for measuring and reporting CSI based on a CSI framework and a device therefor.

In relation to this, this specification proposes a method of performing selection indication for a resource setting (and/or resource set or resource) and/or selection indication for a reporting setting through dynamic signaling.

Specifically, this specification proposes a method of configuring a resource group for pre-configured resource settings (and/or resource sets or resources) and performing the dynamic signaling.

The technical objects of the present disclosure are not limited to the aforementioned technical objects, and other technical objects, which are not mentioned above, will be apparently appreciated by a person having ordinary skill in the art from the following description.

Technical Solution

In a method of reporting, by a user equipment, channel state information (CSI) in a wireless communication system according to an embodiment of the present disclosure, the method includes receiving, from a base station, CSI configuration information related to a CSI reporting procedure, wherein the CSI configuration information includes information indicating one or more measurement settings, information indicating a plurality of reporting settings, and information indicating a plurality of resource settings, receiving, from the base station, reporting information indicating at least one reporting setting of the plurality of reporting settings, and receiving, from the base station, resource information indicating at least one resource set or at least one resource belonging to a specific resource group related to the at least one reporting setting, wherein the specific resource group is configured based on an operation mode on a time domain which is configured for the at least one reporting setting within the plurality of resource settings.

Furthermore, in the method according to an embodiment of the present disclosure, the operation mode on the time domain may correspond to any one of periodic CSI reporting, aperiodic CSI reporting, or semi-persistent CSI reporting.

Furthermore, in the method according to an embodiment of the present disclosure, the CSI configuration information may be received through radio resource control signaling, and the reporting information and the resource information may be received through at least one of downlink control information or a medium access control-control element.

Furthermore, in the method according to an embodiment of the present disclosure, the reporting information and the resource information may be received through one downlink control information simultaneously.

Furthermore, in the method according to an embodiment of the present disclosure, the specific resource group may be one of resource groups configured by combining the plurality of reporting settings and the plurality of resource settings.

Furthermore, in the method according to an embodiment of the present disclosure, the resource groups may be configured based on a combination between an operation mode on a time domain configured for each reporting setting and an operation mode on a time domain configured for each resource setting.

Furthermore, in the method according to an embodiment of the present disclosure, the index of the at least one resource set and the index of the at least one resource belonging to the specific resource group may be re-numbered within the specific resource group.

Furthermore, in the method according to an embodiment of the present disclosure, if the base station is configured to trigger an aperiodic resource for reporting the CSI, the specific resource group may include at least one resource setting pre-configured for the aperiodic CSI reporting among the plurality of resource settings.

Furthermore, in the method according to an embodiment of the present disclosure, if the base station is configured to activate or deactivate a semi-persistent resource for reporting the CSI, the specific resource group may include at least one of at least one resource setting for the aperiodic CSI reporting included in the plurality of resource settings or at least one resource setting for the semi-persistent CSI reporting.

Furthermore, in the method according to an embodiment of the present disclosure, the specific resource group may be configured by additionally taking into consideration a property parameter for each of the plurality of resource settings.

Furthermore, in the method according to an embodiment of the present disclosure, if the specific resource group is configured by additionally taking into consideration a parameter indicating a use of a link between a reporting setting and a resource setting, the parameter indicating the use of the link may be included in the one or more measurement settings.

In a user equipment reporting channel state information (CSI) in a wireless communication system according to an embodiment of the present disclosure, the UE includes a radio frequency (RF) module for transmitting or receiving a radio signal and a processor functionally connected to the RF module. CSI configuration information related to a CSI reporting procedure is received from a base station, wherein the CSI configuration information includes information indicating one or more measurement settings, information indicating a plurality of reporting settings, and information indicating a plurality of resource settings. Reporting information indicating at least one reporting setting of the plurality of reporting settings is received from the base station. Resource information indicating at least one resource set or at least one resource belonging to a specific resource group related to the at least one reporting setting is received from the base station. The specific resource group is configured based on an operation mode on a time domain which is configured for the at least one reporting setting within the plurality of resource settings.

Advantageous Effects

According to an embodiment of the present disclosure, there is an effect in that control signaling overhead can be reduced if a reference signal is transmitted through dynamic signaling or channel measurement or interference measurement is configured.

Advantages which may be obtained in the present disclosure are not limited to the aforementioned effects and other unmentioned advantages will be clearly understood by those skilled in the art from the following description.

DESCRIPTION OF DRAWINGS

The accompanying drawings, which are included herein as a part of a description in order to help understanding of the present disclosure, provide embodiments of the present disclosure, and describe the technical features of the present disclosure with the description below.

MODE FOR INVENTION

Figure 1:
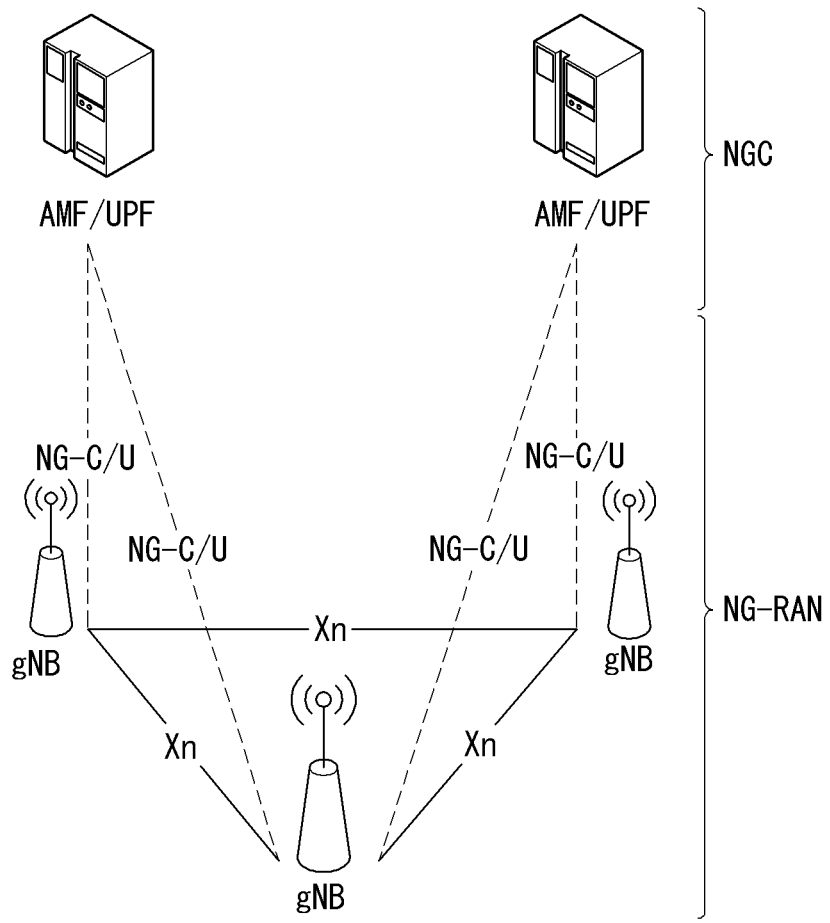
FIG. 1 illustrates an example of an overall structure of a new radio (NR) system to which a method proposed by the present disclosure may be implemented.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In this specification, a base station has a meaning as a terminal node of a network that directly communicates with a terminal. In this document, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A "base station (BS)" may be replaced with a term, such as a fixed station, a Node B, an evolved-NodeB (eNB), a base transceiver system (BTS), an access point (AP), a next generation NB, a general NB or a gNodeB (gNB). Further, a "terminal" may be fixed or mobile and may be replaced with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT(NR) is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC.

Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface.

Overview of System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In the embodiments of the present disclosure, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB. In relation to a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max}N_f/100) \cdot T_s=10$ ms. The radio frame is composed of ten subframes, each one having a section of $T_{sf}=(\Delta f_{max}N_f/1000) \cdot T_s=1$ ms. In this case, there may be a set of UL frames and a set of DL frames.

Figure 2:
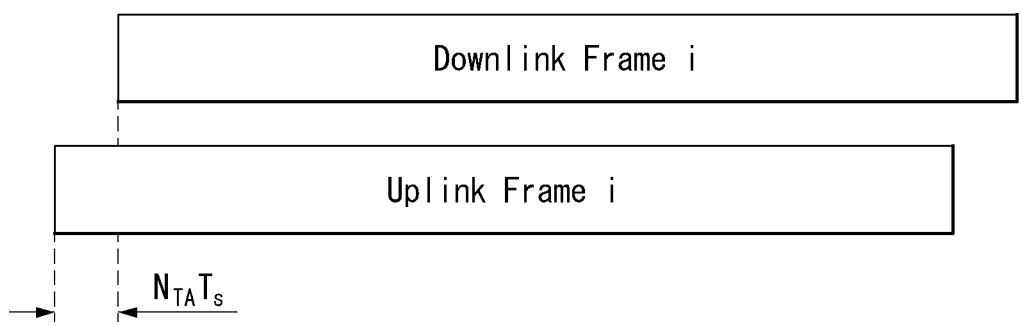
FIG. 2 illustrates a relationship between an uplink (UL) frame and a downlink (DL) frame in a wireless communication system to which a method proposed by the present disclosure may be implemented.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

In relation to the numerology μ, slots are numbered in ascending order of $n_s^\mu \in \{0, \ldots, N_{subframe}^{slots, \mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^{\mu}$, and $N_{symb}^{\mu}$ is determined depending on a numerology in use and slot configuration. The start of slots $n_s^{\mu}$ in a subframe is temporally aligned with the start of OFDM symbols $n_s^{\mu} N_{symb}^{\mu}$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology $\mu$, and Table 3 shows the number of OFDM symbols per slot for an extended CP in the numerology $\mu$.

TABLE 2

| | | | | Slot configuration | | |
| | | 0 | | | 1 | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
|---|---|---|---|---|---|---|
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | | | Slot configuration | | |
| | | 0 | | | 1 | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
|---|---|---|---|---|---|---|
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

In relation to physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted may be inferred from another channel over which a symbol on the same antenna port is transmitted. When large-scale properties of a channel received over which a symbol on one antenna port may be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
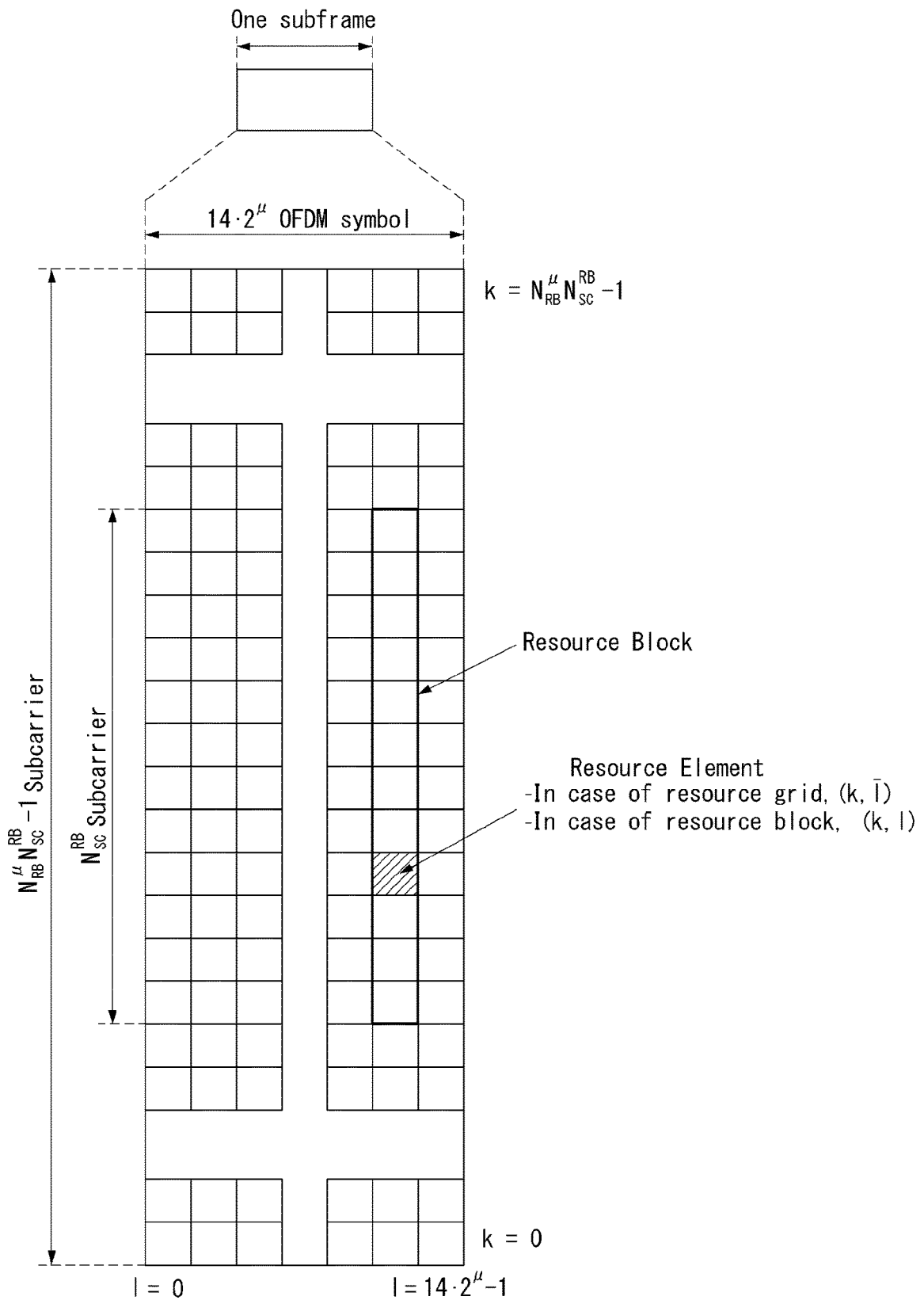
FIG. 3 illustrates an example of a resource grid supported in a wireless communication system to which a method proposed by the present disclosure may be implemented.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of 14·2$\mu$. OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols. Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

Figure 4:
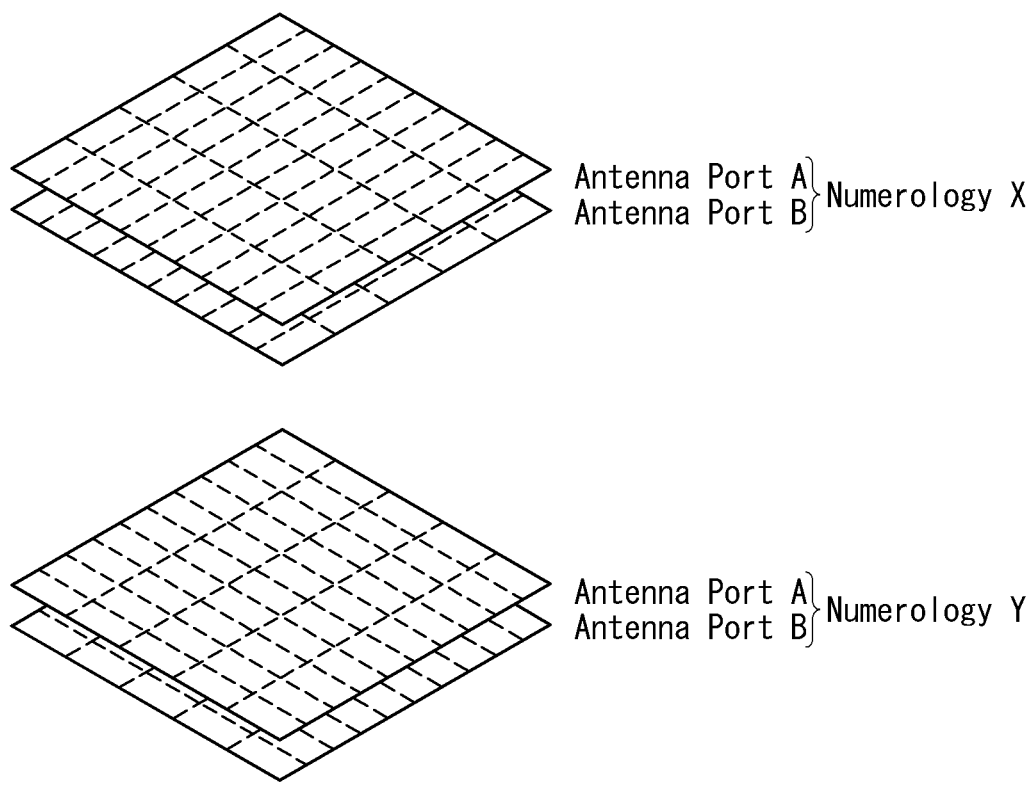
FIG. 4 illustrates examples of resource grids for each antenna port and numerology to which a method proposed in this specification may be applied.

In this case, as illustrated in FIG. 4, one resource grid may be configured for the numerology $\mu$ and an antenna port p.

FIG. 4 shows an example of antenna ports and ringer-specific resource grids to which the method proposed herein may be applied.

Each element of the resource grid for the numerology $\mu$ and the antenna port p is indicated as a resource element, and may be uniquely identified by an index pair (k,l̄). Herein, $k=0, \ldots, N_{RB}^{\mu} N_{sc}^{RB}-1$ is an index in the frequency domain, and $\bar{l}=0, \ldots, 2^{\mu} N_{symb}^{(\mu)}-1$ indicates a location of a symbol in a subframe. To indicate a resource element in a slot, the index pair (k,l) is used. Herein, $l=0, \ldots, N_{symb}^{\mu}-1$.

The resource element (k,l̄) for the numerology $\mu$ and the antenna port p corresponds to a complex value $a_{k,\bar{l}}^{(p,\mu)}$. When there is no risk of confusion or when a specific antenna port or numerology is specified, the indexes p and $\mu$ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \qquad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Beam Management

In NR, beam management is defined as follows.

Beam management: A set of L1/L2 procedures for obtaining and maintaining a set of TRP(s) and/or UE beams that may be used for DL and UL transmission/reception, including at least:

Beam determination: operation of the TRP(s) or the UE selecting transmission/reception beam thereof.

Beam measurement: operation of the TRP(s) or the UE selecting transmission/reception beam thereof.

Beam reporting: operation in which the UE reports information of a beamformed signal based on beam measurement.

Beam sweeping: operation of covering a spatial region using a transmitted and/or received beam for a time interval in a predetermined scheme.

Further, Tx/Rx beam correspondence between a TRP and a UE is defined as follows:

The Tx/Rx beam correspondence in the TRP is maintained if at least one of the followings is satisfied:

The TRP may determine a TRP reception beam for uplink reception based on the UE's downlink measurement for one or more transmission beams of the TRP.

The TRP may determine a TRP Tx beam for downlink reception based on uplink measurement of the TRP for one or more Rx beams of the TRP.

The Tx/Rx beam correspondence in the UE is maintained if at least one of the followings is satisfied:

The UE may determine a UE Tx beam for uplink transmission based on downlink measurement of the UE for one or more Rx beams of the UE.

The UE may determine a UE reception beam for downlink reception based on an instruction of the TRP based on uplink measurement for one or more Tx beams.

A capability indication of UE beam correspondence related information is supported to the TRP.

The following DL L1/L2 beam management procedures are supported within one or more TRPs.

P-1: Used to enable UE measurement for different TRP Tx beams to support selection of TRP Tx beam/UE Rx beam(s).

For beamforming in the TRP, P-1 generally includes intra-TRP/inter-TRP Tx beam sweeps from a set of different beams. For beamforming in the UE, P-1 typically includes a UE Rx beam sweep from a set of different beams.

P-2: Used to allow UE measurements for different TRP Tx beams to change inter/intra-TRP Tx beam(s).

P-3: UE measurement for the same TRP Tx beam is used to change the UE Rx beam when the UE uses beamforming.

Aperiodic reporting triggered by the network is at least supported in P-1, P-2, and P-3 related operations.

The UE measurement based on RS for beam management (at least CSI-RS) is constituted by K (total number of beams) beams and the UE reports the measurement results of N selected Tx beams. In this case, N is not particularly a fixed number. Procedures based on RS for mobility purposes are not excluded. Reporting information at least includes a measurement quantity for N beam(s) if N<K and information indicating N DL transmission beams. In particular, for UEs with K'>1 non-zero-power (NZP) CSI-RS resources, the UE may report N' CRIs (CSI-RS resource indicators).

The UE may be set as the following higher layer parameters for beam management.

N≥1 reporting setting and M≥1 resource setting

Links between reporting settings and resource settings are set in agreed CSI measurement settings.

CSI-RS-based P-1 and P-2 are supported with the resource and reporting settings.

P-3 may be supported with or without the reporting settings.

Reporting setting that includes at least:

Information indicating the selected beam

L1 measurement reporting

Time domain operation (e.g., aperiodic operation, periodic operation, semi-persistent operation)

Frequency granularity when multiple frequency granularities are supported

Resource setting that includes at least:

Time domain operation (e.g., aperiodic operation, periodic operation, semi-persistent operation)

RS type: at least NZP CSI-RS

At least one CSI-RS resource set. Each CSI-RS resource set includes K≥1 CSI-RS resources (Some parameters of K CSI-RS resources may be the same. For example, port number, a time domain operation, density, and periodicity).

Further, NR supports a next beam report considering L group with L>1.

Information indicating minimal groups

Measurement quantity (L1 RSRP and CSI reporting support (when the CSI-RS is for CSI acquisition)) for N1 beam If applicable, information indicating N1 DL transmission beams The group-based beam reporting as described above may be configured on a UE-by-UE basis. Further, the group-based beam reporting may be turned off on the UE-by-UE basis (e.g., when L=1 or N1=1).

NR supports that UE may trigger a mechanism which the UE recovers from the beam failure.

A beam failure event occurs when a quality of a beam pair link of an associated control channel is sufficiently low (e.g., a comparison with a threshold, a timeout of an associated timer). The mechanism recovered from the beam failure is triggered when the beam failure occurs.

The network explicitly configures in the UE with resources for transmission of UL signals for recovery purpose. Configurations of the resources are supported where the base station is listening from all or some directions (e.g., random access region).

The UL transmission/resource reporting the beam failure may be located at the same time instance as the PRACH (the resource orthogonal to the PRACH resource) or at a difference time instance (configurable for the UE) from the PRACH. The transmission of the DL signal is supported so that the UE may monitor the beam to identify new potential beams.

The NR supports the beam management regardless of a beam-related indication. When the beam related indication is provided, information regarding a UE side beamforming/receiving procedure used for CIS-RS based measurement may be indicated to the UE through the QCL. As QCL parameters to be supported by the NR, parameters for delay, Doppler, average gain, etc. used in the LTE system and a spatial parameter for beamforming at a receiver is scheduled to be added and the QCL parameter may include angle of arrival related parameters in terms of UE reception beamforming and/or angle of departure related parameters in terms of base station reception beamforming. The NR supports the use of the same or different beams in the control channel and the corresponding data channel transmission.

For NR-PDCCH transmissions supporting robustness to beam pair link blocking, the UE may be configured to simultaneously monitor NR-PDCCH on M beam-pair links. In this case, M≥1 and a maximum value of M may depend on at least a UE capability.

The UE may be configured to monitor the NR-PDCCH on different beam-pair link(s) in different NR-PDCCH OFDM symbols. Parameters related to a UE Rx beam configuration for monitoring the NR-PDCCH on multiple beam-pair links are configured by higher layer signaling or MAC CE and/or considered in a search space design.

At least, the NR supports an indication of a spatial QCL assumption between DL RS antenna port(s) and DL RS antenna port(s) for demodulation of the DL control channel. A candidate signaling method for a beam indication for the NR-PDCCH (i.e., a configuration method for monitoring the NR-PDCCH) includes MAC CE signaling, RRC signaling, DCI signaling, specification transparent and/or implicit methods, and combinations of the signaling methods.

For the reception of a unicast DL data channel, the NR supports the indication of the spatial QCL assumption between the DL RS antenna port and the DMRS antenna port of the DL data channel.

Information indicating the RS antenna port is indicated via DCI (downlink grant). Further, the information also indicates the RS antenna port QCLed with the DMRS antenna port. A different set of DMRS antenna ports for a DL data channel may be represented as a different set of RS antenna ports and a QCL.

Hereinafter, prior to describing the methods proposed in this specification in detail, contents directly or indirectly related to the methods proposed in this specification will be briefly described first.

In next-generation communication including 5G, New Rat (NR), etc., as more and more communication devices require a larger communication capacity, there is a need for enhanced mobile broadband communication as compared with the existing radio access technology.

Further, massive machine type communications (MTCs), which provide various services anytime and anywhere by connecting many devices and objects, are one of the major issues to be considered in the next generation communication.

In addition, a communication system design or structure considering a service/UE sensitive to reliability and latency is being discussed.

The introduction of next generation radio access technology (RAT) considering enhanced mobile broadband communication (eMBB), massive MTC (mMTC), ultra-reliable and low latency communication (URLLC) is currently discussed, and in this specification, the technology is called 'new RAT (NR)' for convenience.

Self-Contained Slot Structure

Figure 5:
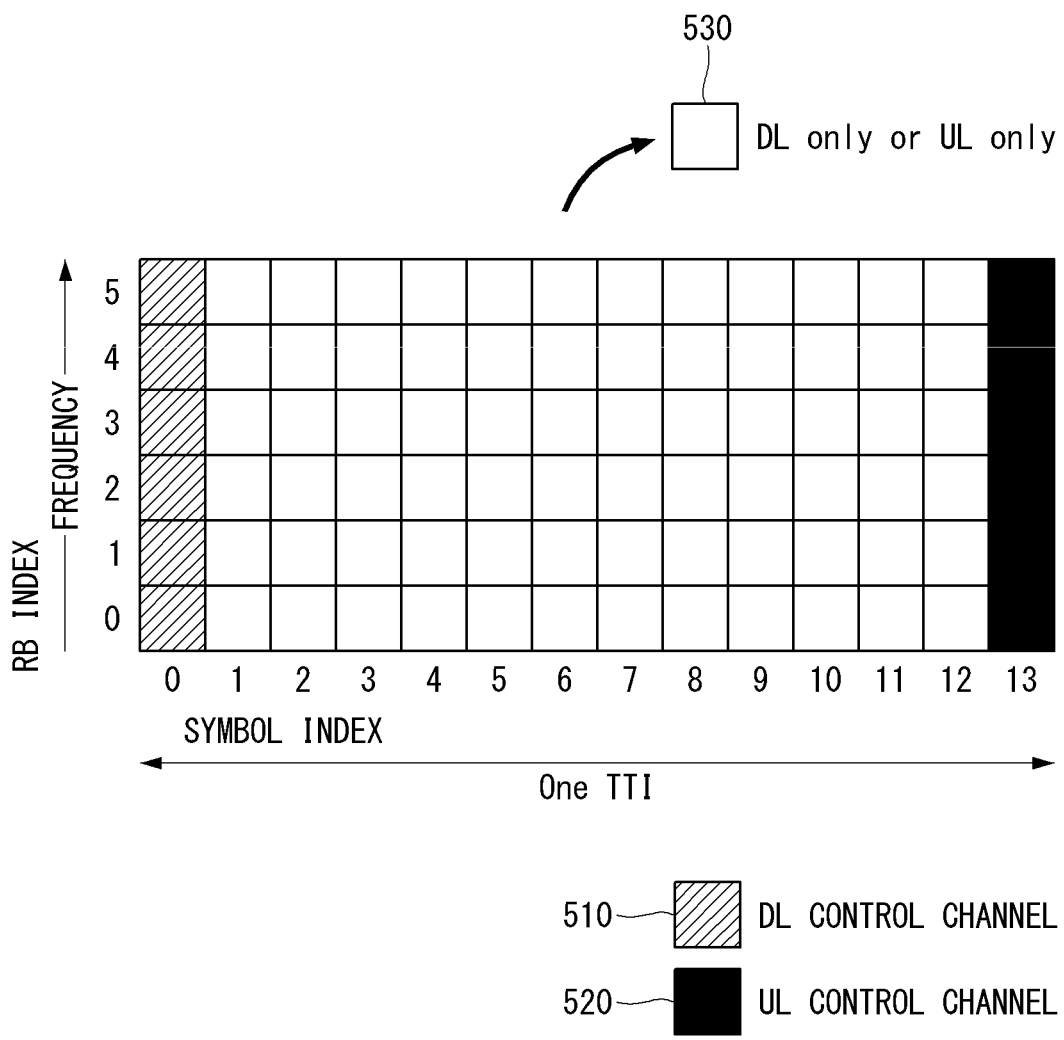
FIG. 5 is a diagram illustrating one example of a self-contained slot structure to which the method proposed in the present specification may be applied.

In order to minimize the latency of data transmission in a TDD system, the fifth generation new RAT considers a self-contained slot structure as shown in FIG. 5.

That is, FIG. 5 is a diagram illustrating one example of a self-contained slot structure to which the method proposed in this specification may be applied.

In FIG. 5, a dashed area 510 indicates a downlink control area and a black area 520 indicates an uplink control area.

An unmarked area 530 may be used for downlink data transmission or for uplink data transmission.

Such a structure may be characterized in that DL transmission and UL transmission are sequentially performed in one slot, and DL data may be transmitted in one slot, and UL ACK/NACK may also be transmitted and received.

Such a slot may be defined as a 'self-contained slot'.

That is, through such a slot structure, it takes less time for the eNB to retransmit data to the UE when a data transmission error occurs, thereby minimizing the latency of final data transmission.

In such a self-contained slot structure, there is a need for a time gap between the eNB and the UE for the conversion process from the transmission mode to the reception mode or from the reception mode to the transmission mode.

To this end, some OFDM symbols at the time of switching from DL to UL in the slot structure are configured to a guard period (GP).

Analog Beamforming

In the millimeter wave (mmW), the wavelength is shortened, so that a plurality of antenna elements may be installed in the same area.

That is, a total of 64 (8×8) antenna elements may be installed in a 2-dimension array at a 0.5 lambda (wavelength) interval on a panel of 4×4 cm with a wavelength of 1 cm in a 30 GHz band.

Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource.

However, when the TXRUs are installed on all of approximately 100 antenna elements, there is a problem that effectiveness is deteriorated in terms of costs.

Therefore, a method of mapping a plurality of antenna elements to one TXRU and adjusting a direction of a beam using an analog phase shifter is considered.

Such an analog beamforming method has a disadvantage in that frequency selective beamforming may not be performed by making only one beam direction in all bands.

A hybrid BF (HBF) with B TXRUs, which is an intermediate form of digital BF and analog BF, and fewer than Q antenna elements, may be considered.

In the HBF, although there is a difference depending on a connection method of B TXRUs and Q antenna elements, the number of directions of the beams that may be transmitted at the same time is limited to B or less.

Figure 6A:
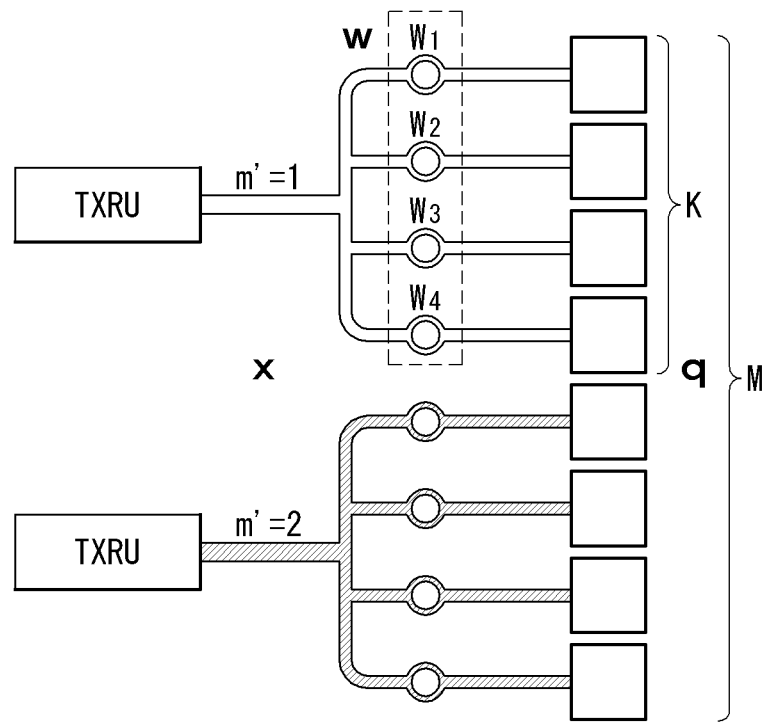
FIGS. 6A and 6B illustrate examples of a connection scheme of a TXRU and an antenna element to which a method proposed in this specification may be applied.
Figure 6B:
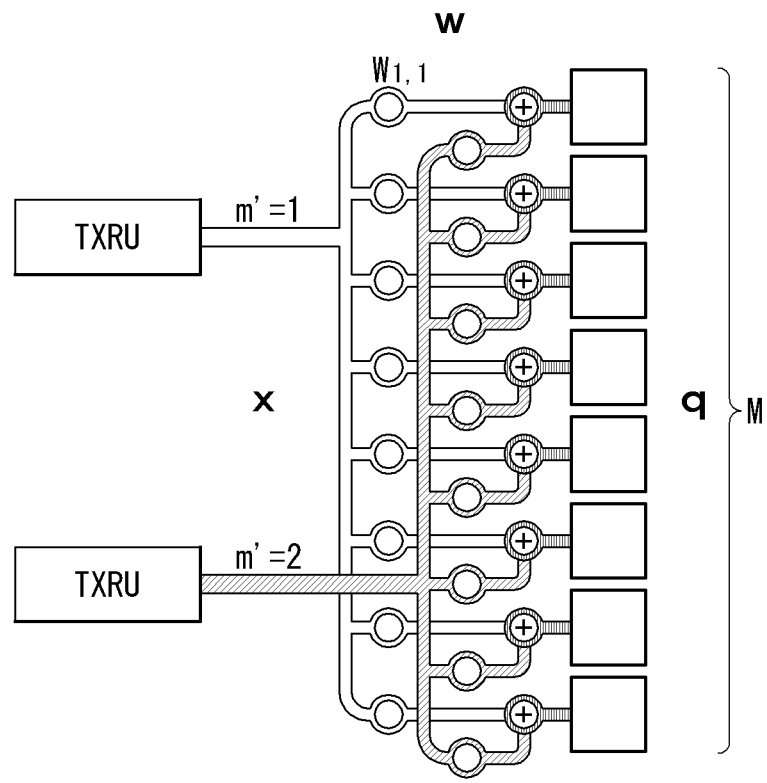

FIGS. 6A and 6B illustrate examples of a connection scheme of a TXRU and an antenna element to which a method proposed in this specification may be applied.

In this case, a TXRU virtualization model shows a relationship between an output signal of the TXRUs and an output signal of the antenna elements.

FIG. 6A illustrates an example of a scheme in which the TXRU is connected to a sub-array.

Referring to FIG. 6A, the antenna element is connected only to one TXRU. Unlike FIG. 6A, FIG. 6B illustrates a scheme in which the TXRU is connected to all antenna elements.

That is, in the case of FIG. 6B, the antenna element is connected to all TXRUs.

In FIGS. 6A and 6B, W represents a phase vector multiplied by an analog phase shifter.

In other words, a direction of analog beamforming is determined by W. In this case, mapping of CSI-RS antenna ports and TXRUs may be 1-to-1 or 1-to-many.

CSI Feedback

In a 3GPP LTE/LTE-A system, user equipment (UE) is defined to report channel state information (CSI) to a base station (BS).

In this case, the channel state information (CSI) collectively refers to information that may indicate the quality of a radio channel (or also referred to as a link) formed between the UE and the antenna port.

For example, a rank indicator (RI), a precoding matrix indicator (PMI), a channel quality indicator (CQI), and the like correspond to the information.

In this case, the RI represents rank information of a channel, which means the number of streams received by the UE through the same time-frequency resource. Since this value is determined depending on the long term fading of the channel, the value is fed back from the UE to the BS with a period usually longer than the PMI and the CQI.

The PMI is a value reflecting a channel space characteristic and represents a preferred precoding index preferred by the UE based on a metric such as SINR.

The CQI is a value representing the strength of the channel, and generally refers to a reception SINR that may be obtained when the BS uses the PMI.

In the 3GPP LTE/LTE-A system, the BS configures a plurality of CSI processes to the UE and may receive CSI for each process.

In this case, the CSI process is constituted by a CSI-RS for signal quality measurement from the BS and a CSI-interference measurement (CSI-IM) resource for interference measurement.

Reference Signal (RS) Virtualization

In the mmW, it is possible to transmit a PDSCH only in one analog beam direction at a time by analog beamforming.

Therefore, the eNB transmits data only to a small number of some UEs in a specific direction.

Therefore, if necessary, the analog beam direction is differently configured for each antenna port so that data transmission may be simultaneously performed to a plurality of UEs in several analog beam directions.

Figure 7A:
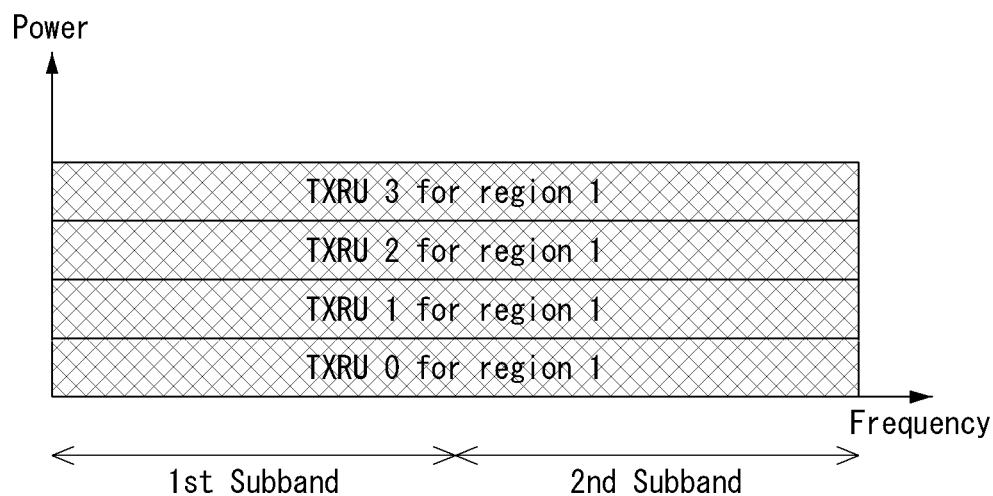
FIGS. 7A to 7C illustrate various examples of a service area for TXRU to which a method proposed in this specification may be applied.
Figure 7B:
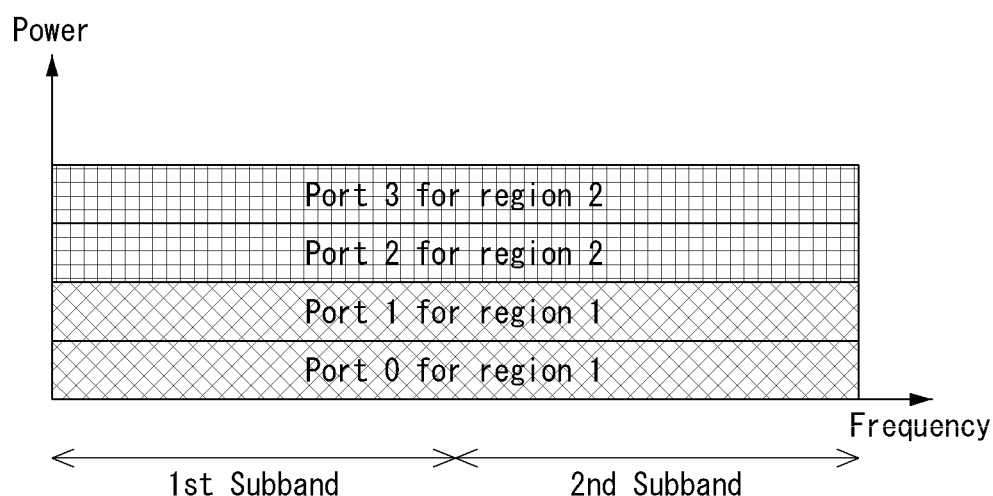
Figure 7C:
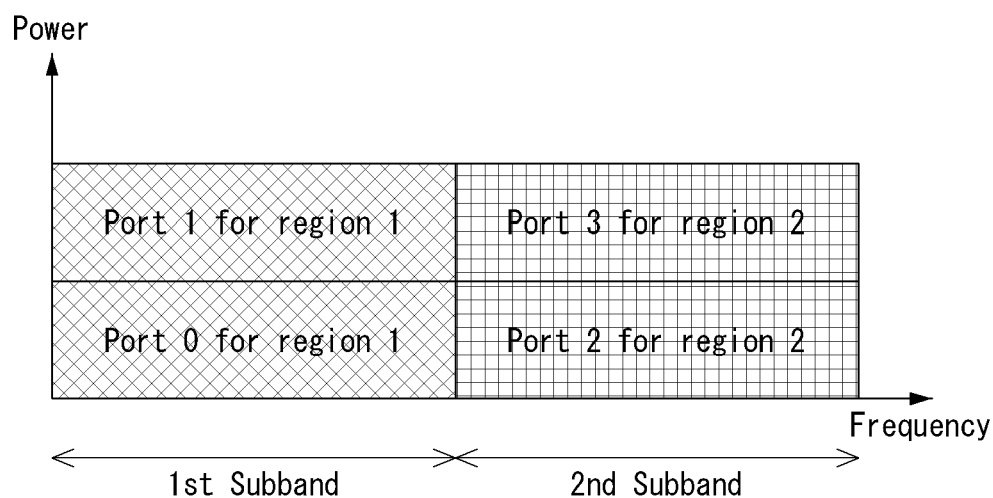

FIGS. 7A to 7C illustrate various examples of a service area for TXRU to which a method proposed in this specification may be applied.

In FIGS. 7A to 7C, 256 antenna elements are divided into 4 parts to form 4 sub-arrays, and the structure of connecting the TXRU to each sub-array will be described as an example.

When each sub-array is constituted by a total of 64 (8×8) antenna elements in the form of a 2-dimensional array, specific analog beamforming may cover an area corresponding to a 15-degree horizontal angle area and a 15-degree vertical angle area.

That is, the zone where the eNB should be served is divided into a plurality of areas, and services are provided one by one at a time.

In the following description, it is assumed that the CSI-RS antenna ports and the TXRUs are 1-to-1 mapped.

Therefore, it may be interpreted that the antenna port and the TXRU have the same meaning as the following description.

If all TXRUs (antenna ports, sub-arrays) have the same analog beamforming direction as illustrated in FIG. 7A, the throughput of the corresponding zone may be increased by forming digital beam with higher resolution.

Further, it is possible to increase the throughput of the corresponding zone by increasing the RANK of the transmission data to the corresponding zone.

In addition, as illustrated in FIG. 7B, if each TXRU (antenna port, sub-array) has a different analog beamforming direction, the data may be transmitted simultaneously to UEs distributed in a wider area in the subframe (SF).

As illustrated in FIG. 7B, two of four antenna ports are used for PDSCH transmission to UE1 in region 1 and the remaining two antenna ports are used for PDSCH transmission to UE2 in Area 2.

Further, FIG. 7B illustrates an example in which PDSCH 1 transmitted to UE 1 and PDSCH 2 transmitted to UE 2 are subjected to spatial division multiplexing (SDM).

Unlike this, as illustrated in FIG. 7C, PDSCH 1 transmitted to UE 1 and PDSCH 2 transmitted to UE 2 may be transmitted by frequency division multiplexing (FDM).

Among a scheme of servicing one area using all the antenna ports and a scheme of servicing many areas at the same time by dividing the antenna ports, a preferred scheme may be changed according to the RANK and the MCS servicing to the UE for maximizing the cell throughput.

Further, the preferred scheme is changed according to the amount of data to be transmitted to each UE.

The eNB calculates a cell throughput or scheduling metric which may be obtained when one area is serviced using all the antenna ports, and calculates the cell throughput or scheduling metric which may be obtained when two areas are serviced by dividing the antenna ports.

The eNB compares the cell throughput or the scheduling metric which may be obtained by each scheme to select the final transmission scheme.

As a result, the number of antenna ports participating in PDSCH transmission is changed by SF-by-SF.

In order for the eNB to calculate the transmission MCS of the PDSCH according to the number of antenna ports and reflect the calculated transmission MCS to a scheduling algorithm, the CSI feedback from the appropriate UE is required.

Beam Reference Signal (BRS)

Beam reference signals are transmitted on one or more antenna ports (p={0, 1, . . . , 7}).

Reference sequence $r_l(m)$ is defined by Equation 2 in relation with generation of a sequence of the BRSs.

$$r_l(m) = \frac{1}{\sqrt{2}}(1 - 2 \cdot c(2m)) + j\frac{1}{\sqrt{2}}(1 - 2 \cdot c(2m+1)),$$ [Equation 2]

$$m = 0, 1, \ldots, 8 \cdot (N_{RB}^{max,DL} - 18) - 1$$

In Equation 2, 1 as 0 to 13 represents an OFDM symbol number. Further, c(i) denotes a pseudo-random sequence and a pseudo-random sequence generator may be initialized to Equation 3 at the beginning of each OFDM symbol.

$$C_{init} = 2^{10} \cdot (7 \cdot (n_s+1)+l'+1) \cdot (2 \cdot N_{ID}^{cell}+1$$ [Equation 3]

Beam Refinement Reference Signal

Further, in relation with the beam refinement reference signal, the beam refinement reference signal is transmitted through antenna ports of up to 8 antenna ports (p=600 to 607).

In relation with the sequence generation of the beam refinement reference signal, reference signal $r_{l,n_s}(m)$ is generated as shown in Equation 4.

$$r_{l,n_s}(m) = \frac{1}{\sqrt{2}}(1 - 2c(2m)) + j\frac{1}{\sqrt{2}}(1 - 2c(2m+1)),$$ [Equation 4]

-continued
$$m = 0, 1, \ldots, \left\lfloor \frac{3}{8} N_{RB}^{max,DL} \right\rfloor - 1$$

In Equation 4, $n_s$ represents a slot number in a radio frame and l represents the OFDM symbol number in the slot. c(n) denotes the pseudo-random sequence and the pseudo-random sequence generator is initialized to Equation 5 at the beginning of each OFDM symbol.

$$C_{init}=2^{10}\cdot(7\cdot(\bar{n}_s+1)+l+1)(2N_{ID}^{BRRS}+1)+2N_{ID}^{BRRS}+1 \quad \text{[Equation 5]}$$

In Equation 5, $N_{ID}^{BRRS}$ is configured in the UE through an RRC signaling.

DL Phase Noise Compensation Reference Signal

A phase noise compensation reference signal associated with xPDSCH (i.e., the PDSCH supported by the NR system) is transmitted at the antenna port(s) p=60 and/or p=61 via A signaling in A DCI format. Further, the phase noise compensation reference signal is present and/or valid only for the xPDSCH transmission associated with the antenna port, and is transmitted only in the physical resource blocks and symbols to which an sPDSCH is mapped. Further, the phase noise compensation reference signal is the same in all symbols corresponding to xPDSCH allocation.

Reference sequence r(m) is defined by Equation 6 in relation with generation of the sequence of the phase noise compensation reference signal.

$$r(m) = \frac{1}{\sqrt{2}}(1-2\cdot c(2m)) + j\frac{1}{\sqrt{2}}(1-2\cdot c(2m+1)), \quad \text{[Equation 6]}$$
$$m = 0, 1, \ldots, \lfloor N_{RB}^{max,DL}/4 \rfloor - 1$$

In Equation 6, c(i) denotes the pseudo-random sequence and the pseudo-random sequence generator is initialized to Equation 7 at the beginning of each subframe.

$$c_{init}=(\lfloor n_s/2 \rfloor=1)\cdot(2n_{ID}^{(SCID)}+1)\cdot2^{16}=n_{SCID} \quad \text{[Equation 7]}$$

In Equation 7, in the case of transmission of the xPDSCH, $n_{SCID}$ is given by a DCI format related with the transmission of the xPDSCH and otherwise, $n_{SCID}$ is set to 0.

Further, in the case of 3-dimension multiple-input multiple-output (3D-MIMO) or full-dimension multiple-input multiple-output (MIMO) technology, an active antenna system (AAS) having a 2-dimensional planar array structure may be used.

Figure 8:
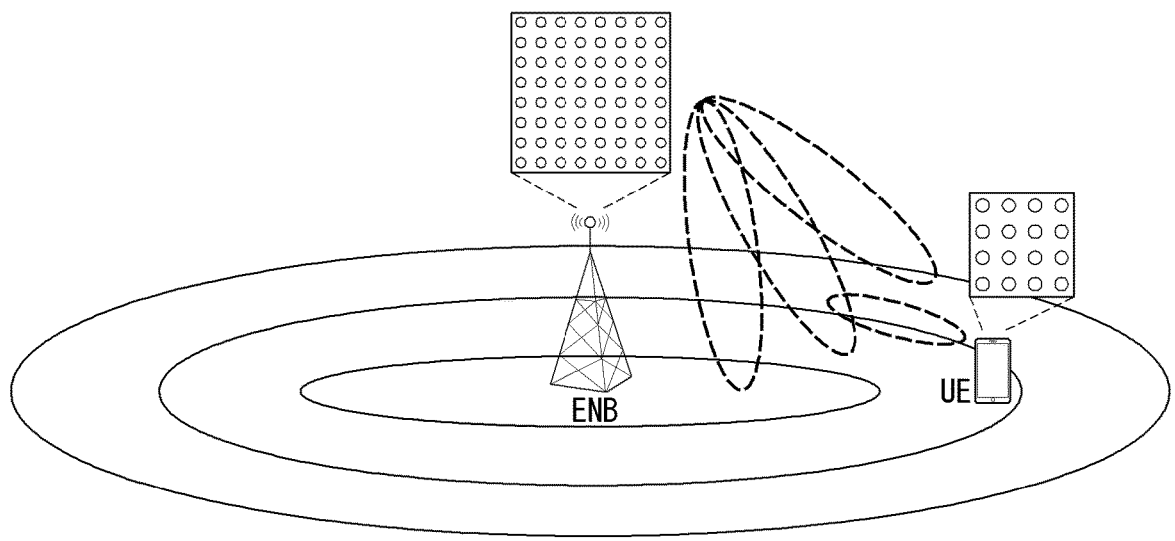
FIG. 8 illustrates an example of an MIMO system using a 2D plane array structure to which a method proposed in this specification may be applied.

FIG. 8 illustrates an example of an MIMO system using a 2D plane array structure to which a method proposed in this specification may be applied.

Through the 2D plane array structure, a large number of antenna elements may be packed within available base station type of elements and an adaptive electronic capability in a 3D space may be provided.

In relation with an MIMO design of the NR system, a CSI framework for measuring and reporting a channel state between the eNB and the UE is considered.

This specification proposes a CSI reporting method based on a CSI framework (or CSI acquisition framework) that is described hereinafter. First, a CSI framework considered in the NR system is described specifically. First, the CSI framework considered in the NR system will be described in detail.

The CSI framework may mean that a CSI related procedure is defined using CSI reporting setting, resource setting, CSI measurement setting, and CSI measurement setting unlike a legacy LTE system in which the CSI related procedure is defined only in the form of a CSI process. Accordingly, in the NR system, the CSI related procedures may be performed in a more flexible scheme according to a channel and/or resource situation.

That is, a configuration for the CSI related procedure in the NR system may be defined by combining the CSI reporting setting, the resource setting, and the CSI measurement setting.

For example, the UE may be configured to acquire the CSI by N≥1 CSI reporting settings, M≥1 resource settings, and one CSI measurement setting. In this case, the CSI measurement setting may mean setting information for a link between N CSI reporting settings and M resource settings. Further, here, the resource settings include reference signal (RS) settings and/or Interference Measurement settings (IM settings).

Figure 9:
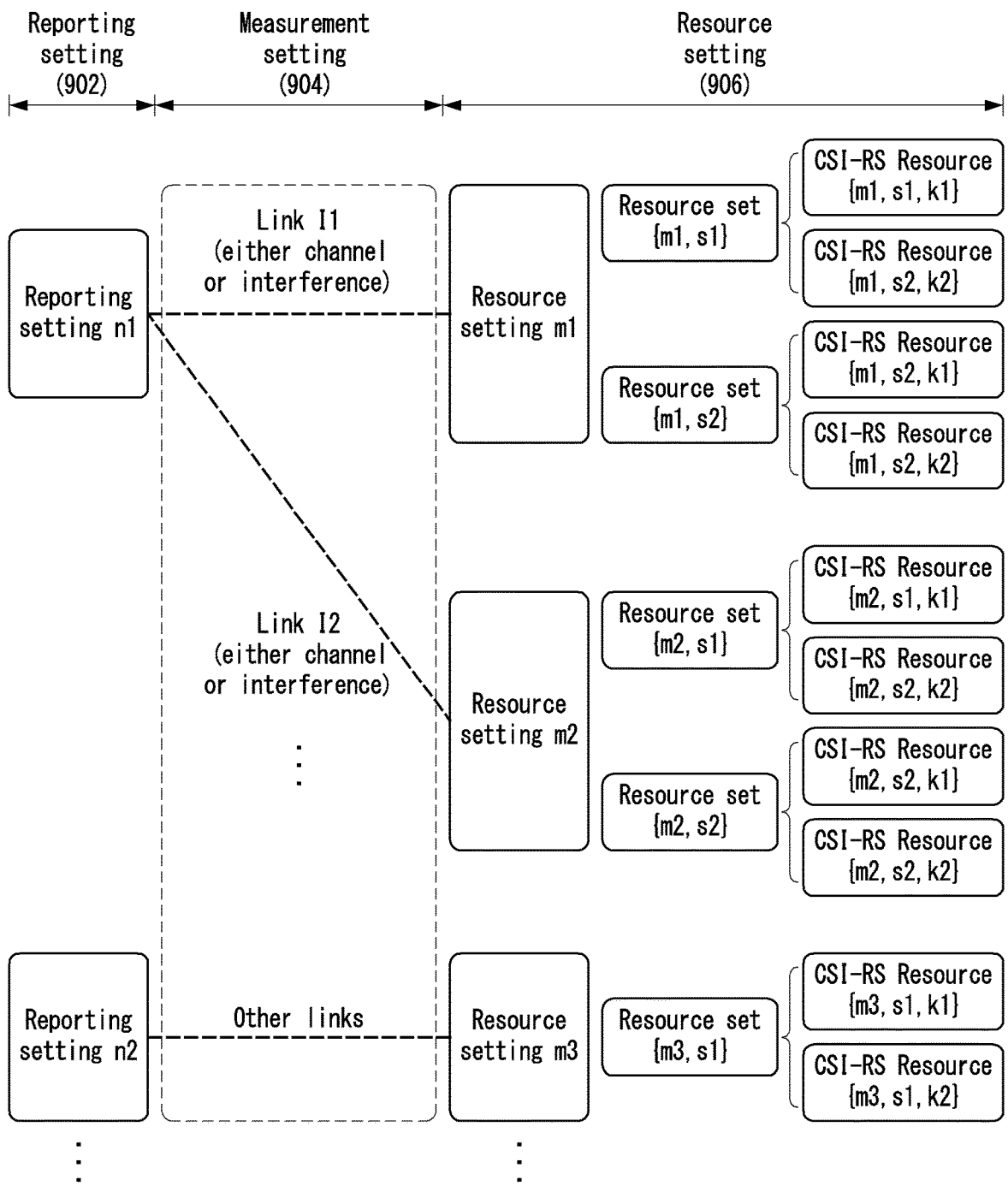
FIG. 9 illustrates an example of a CSI framework considered in an NR system to which a method proposed in this specification may be applied.

FIG. 9 illustrates an example of a CSI framework considered in an NR system to which a method proposed in this specification may be applied.

Referring to FIG. 9 may be configured by reporting setting 902, measurement setting 904, and resource setting 906. In this case, the reporting setting may mean the CSI reporting setting, the measurement setting may mean the CSI measurement setting, and the resource setting may mean the CSI-RS resource setting.

In FIG. 9, the CSI-RS resource has been illustrated, but the present disclosure is not limited thereto. The CSI-RS resource may be substituted with a resource for a downlink reference signal (DL RS) available for CSI acquisition or beam management.

As illustrated in FIG. 9, the reporting setting 902 may be constituted by N (N≥1) report settings (e.g., Reporting setting n1, Reporting setting n2, etc.).

Further, the resource setting 906 may be constituted by M (M≥1) resource settings (e.g., Resource setting m1, Resource setting m2, Resource setting m3, etc.). In this case, each resource setting may include S (S≥1) resource sets and each resource set may include K (K≥1) CSI-RSs.

Further, the measurement setting 904 may mean setting information indicating the link between the reporting setting and the resource setting and a measurement type configured for the corresponding link. In this case, each measurement setting may include L (L≥1) links. For example, the measurement setting may include setting information for a link (Link 11) between Reporting setting n1 and Resource setting m1, setting information for a link (Link 12) between Reporting setting n1 and Resource setting m2, and the like.

In this case, each of Link 11 and Link 12 may be configured as any one of a channel measurement link or an interference measurement link. Moreover, Link 11 and/or Link 12 may be configured for rate matching or other purposes.

In this case, one or more CSI reporting settings within one CSI measurement setting may be selected dynamically via Layer 1 (L2) signaling or L2 (Layer 2) signaling. Further, one or more CSI-RS resource sets selected from at least one resource setting and one or more CSI-RS resources selected from at least one CSI-RS resource set are also dynamically selected via the L1 or L2 signaling.

Hereinafter, the CSI reporting setting, the resource setting (i.e., CSI-RS resource setting), and the CSI measurement setting constituting the CSI framework considered in the NR system will be described.

CSI Reporting Setting

First, a CSI reporting setting may mean information for setting the type of CSI reporting to be performed by a UE with respect to a base station and information included in corresponding CSI reporting.

For example, a CSI reporting setting may include a time-domain behavior type, frequency granularity, a CSI parameter (e.g., precoding matrix indicator (PMI), rank indicator (RI), channel quality indicator (CQI)) to be reported, a CSI type (e.g., CSI Type 1 or 2), a codebook configuration including a codebook subset restriction, and a measurement restriction configuration.

In this specification, a time-domain behavior type may mean an aperiodic behavior, a periodic behavior, or a semi-persistent behavior.

In this case, a configuration parameter(s) for a CSI reporting setting may be configured (or indicated) through higher layer signaling (e.g., RRC signaling).

Furthermore, in relation to the CSI reporting setting, three types of frequency granularities, that is, wideband reporting, partial band reporting and subband reporting, may be supported.

Resource Setting

Next, the resource setting may mean information for setting resource to be used for CSI measurement and reporting. For example, the resource setting may include an operation pattern of the time domain, a type (e.g., Non-Zero Power CSI-RS (NZP CSI-RS), Zero Power CSI-RS (ZP CSI-RS), DMRS, etc.) of the RS, a resource set constituted by K resources, and the like.

As mentioned above, each resource setting may include one or more resource sets and each resource set may include one or more resources (e.g., CSI-RS resources). Further, the resource setting may include a setting for a signal for channel measurement and/or interference measurement.

As an example, each resource setting may include setting information for S resource sets (e.g., CSI-RS resource sets) and may also include setting information for K resources for each resource set. In this case, each resource set may correspond to sets differently selected from a pool of all CSI-RS resources configured for the UE. Further, the setting information for each resource may include information to a resource element, the number of ports, the operation type of the time domain, and the like.

Alternatively, as another example, each resource setting may include setting information for S CSI-RS resources and/or K CSI-RS resources of ports of a number equal to or smaller than each CSI-RS resource.

In this case, a CSI-RS RE mapping pattern of an N-port CSI-RS resource may be constituted by one or more CIS-RS mapping patterns of CSI-RS resources of the same or smaller number. In this case, the CSI-RS RS mapping pattern may be defined in the slot and spanned to multiple configurable consecutive/inconsecutive OFDM symbols.

In this case, a setting parameter(s) for the resource setting may be configured through higher layer signaling (e.g., RRC signaling).

Furthermore, in the case of each a semi-persistent resource setting or a periodic resource setting, periodicity may be additionally included in configuration information.

CSI Measurement Setting

Next, the CSI measurement setting may mean setting information indicating which measurement the UE is to perform with respect to a specific CSI reporting setting and a specific resource setting mapped thereto for the CSI reporting. That is, the CSI measurement setting may include information on the link between the CSI reporting setting and the resource setting and may include information indicating a measurement type for each link. Further, the measurement type may mean channel measurement, interference measurement, rate matching, etc.

As an example, the CSI measurement setting may include information indicating the CSI reporting setting, information indicating the resource setting, and a setting for a reference transmission scheme in the case of the CQI. In this regard, the UE may support L≥1 CSI measurement settings and an L value may be set according to a capability of the corresponding UE.

In this case, one CSI reporting setting may be connected to one or more resource settings and multiple CSI reporting settings may be connected to the same resource setting.

In this case, a setting parameter(s) for the CSI measurement setting may be configured through higher layer signaling (e.g., RRC signaling).

Furthermore, in the NR system, zero-power (ZP) CSI-RS-based interference measurement for CSI feedback is supported. Furthermore, an aperiodic interference measurement resource (IMR), a semi-persistent IMR, and periodic IMRCSI feedback based on a ZP CSI-RS for interference measurement may be supported.

Furthermore, in relation to the CSI reporting setting, resource setting, and CSI measurement setting, agreements according to the time-domain behavior type are as follows.

First, in the case of the periodic CSI-RS (i.e., a case where transmission of the CSI-RS is periodically performed), semi-persistent CSI reporting may be activated/deactivated by MAC CE and/or downlink control information (DCI). Unlike this, the aperiodic CSI reporting may be triggered by the DCI, however, in this case, additional signaling configured to the MAC CE may be required.

Next, in the case of the semi-persistent CSI-RS (i.e., a case where transmission of the CSI-RS is semi-persistently performed), periodic CSI reporting is not supported. On the contrary, semi-persistent CSI reporting may be activated/deactivated by the MAC-CE and/or DCI and the semi-persistent CSI-RS may be activated/deactivated by the MAC-CE and/or DCI. Further, in this case, the aperiodic CSI reporting may be triggered by the DCI and the semi-persistent CS-RS may be activated/deactivated by the MAC-CE and/or DCI.

Last, in the case of the aperiodic CSI-RS (i.e., a case where transmission of the CSI-RS is aperiodically performed), the periodic (and semi-persistent) CSI reporting is not supported. On the contrary, the aperiodic CSI reporting may be triggered by the DCI and the aperiodic CS-RS may be triggered by the DC and/or MAC-CE.

Referring to the contents and the agreements, in the NR system, three time-domain behavior types may be supported in relation to CSI reporting. In this case, the three time-domain behavior types may mean aperiodic CSI reporting, semi-persistent CSI reporting, and periodic CSI reporting. Likewise, the NR system can support some of or all the three time-domain behavior types with respect to reporting related to an (analog and/or digital) beam.

Furthermore, in the case of a downlink reference signal (DL RS) for channel measurement upon CSI acquisition, the three time-domain behavior types (e.g., aperiodic CSI-RS, semi-persistent CSI-RS, and periodic CSI-RS) may be supported. Likewise, some of or all the three time-domain behavior types may be supported for a DL RS for beam management. Basically, a CSI-RS is considered as a DL RS for beam management, but another DL signal may also be used. For example, a DL RS for beam management may be a mobility RS, a beam RS, a synchronization signal (SS), an SS block, a DL DMRS (e.g., PBCH DMRS or PDCCH DMRS), etc.

Furthermore, as described above, the NR system can support a ZP CSI-RS-based interference measurement method in relation to an interference measurement resource (IMR) designated in a UE by a base station upon CSI acquisition. Furthermore, in relation to the interference measurement resource (IMR), at least one of a non-zero-power (NZP) CSI-RS-based interference measurement method or a DMRS-based interference measurement method may be supported.

In particular, unlike in the case where a ZP CSI-RS-based IMR is semi-statically configured in the LTE system (i.e., legacy LTE system), in the NR system, a method of dynamically configuring a ZP CSI-RS-based IMR may be supported. For example, a ZP CSI-RS-based aperiodic IMR, a semi-persistent IMR and/or a periodic IMR method may be used.

Accordingly, various combinations of the time-domain behavior types may be taken into consideration with respect to channel estimation (or channel measurement), interference estimation (or interference measurement), and reporting for CSI measurement and reporting. For example, aperiodic CSI reporting may be configured along with an aperiodic/semi-persistent/periodic NZP CSI-RS for channel measurement and an aperiodic/semi-persistent/periodic ZP CSI-RS for interference measurement. For another example, semi-persistent CSI reporting may be configured along with a semi-persistent/periodic NZP CSI-RS for channel measurement and a semi-persistent/periodic NZP CSI-RS for interference measurement. For yet another example, periodic CSI reporting may be configured along with a periodic NZP CSI-RS for channel measurement and a periodic NZP CSI-RS for interference measurement.

In this specification, "A/B" means A or B, and a combination of changed orders may be taken into consideration between "/." For example, "A/B and C/D" may mean "A and C", "A and D", "B and C", or "B and D."

In the examples, it is assumed that the aperiodic RS and/or IMR (e.g., aperiodic NZP CSI-RS and/or aperiodic ZP CSI-RS) is used for only aperiodic reporting, the semi-persistent RS and/or IMR (e.g., a semi-persistent NZP CSI-RS and/or a semi-persistent ZP CSI-RS) is used for only aperiodic or semi-persistent reporting, and the periodic RS and/or IMR (e.g., periodic NZP CSI-RS and/or periodic ZP CSI-RS) is used for all reportings. However, the present disclosure is not limited thereto, and various combinations (e.g., semi-persistent reporting configured along with an aperiodic RS and/or IMR) may be configured.

Furthermore, an RS and an IMR are included in all resource settings, and the usage (e.g., for channel estimation or for interference estimation) of a corresponding resource may be indicated through a configuration for each link in measurement setting.

Referring to the contents, for example, in the NR system, a radio resource control configuration (RRC configuration) related to CSI measurement and reporting may be defined as in Table 4.

TABLE 4

Values of N, M, and L
Resource setting m (m = 0, . . . , M − 1)
Resource setting-level common properties (e.g. time domain behavior, RS type, RS usage: Beam management or CSI acquisition, frequency location & bandwidth, RS power, etc.)

TABLE 4-continued

Configuration of Resource set s (s = 0, . . . , S − 1)
Resource set-level common properties (e.g. Frequency location & bandwidth, RS power, periodicity, slot offset, the number of ports, etc.)
Configuration of Resource k (k = 0, . . . , $K_s$ − 1) for each set
Resource-level configuration (e.g. mapping to REs, the number of ports, etc.)
Reporting setting "n" (n = 0, . . . N − 1)
Reporting setting configurations (e.g. reported CSI parameter(s), CSI Type (I or II) if reported, codebook configuration including codebook subset restriction, time-domain behavior, frequency granularity for CQI and PMI, measurement restriction configurations, etc.)
Measurement setting
Configuration of Link l (l = 0, . . . L − 1),
Resource setting indicator
Reporting setting indicator
Quantity to be measured (either channel or interference)

Referring to Table 4, a base station may notify a UE of M resource settings, N reporting settings, and one measurement setting through higher layer signaling.

For example, each resource setting (i.e., resource setting m) may include a configuration of a resource setting-level common property and resource set "s." In this case, the resource setting-level common property means a common characteristic transmitted through a resource setting, and may include a time domain behavior, an RS type, an RS usage (beam management or CSI acquisition), a frequency location and bandwidth, RS power, etc.

Furthermore, the configuration of a resource set may mean configuration information for S resource sets configuring a resource setting. Each resource set (i.e., resource set "s") may include a common property (e.g., frequency location and bandwidth, RS power, period, slot offset, and the number of ports) of a resource set level and a resource k (i.e., K resources may be included in each resource set) for each set. Furthermore, each resource set may also include mapping to REs, and configuration information in a resource level, such as the number of ports.

Furthermore, each reporting setting (i.e., reporting setting "n") may include configuration information related to reporting. For example, the configuration information related to reporting may include a reported CSI parameter, a CSI type (CSI type 1 or 2) if reported, a codebook configuration including a codebook subset restriction, a time domain behavior, frequency granularity for a CQI and a PMI, a measurement restriction configuration, etc.

Furthermore, measurement setting may include configuration information for L links. In this case, the corresponding configuration information may include a resource setting indicator configured for a corresponding link, a reporting setting indicator and/or information representing an index (e.g., channel or interference) to be measured.

A UE that has received RRC configuration information may prepare or perform channel and/or interference measurement suitable for each reporting setting.

Furthermore, in the NR system, a method of triggering, activating and/or deactivating a CSI reporting setting or CSI resource setting through hierarchical signaling may be taken into consideration.

For example, in order to support a dynamic reporting triggering/activation/deactivation operation, in the NR system, a method of selecting one or more reporting settings through dynamic signaling, among N reporting settings configured through higher layer signaling, may be introduced. For example, the higher layer signaling may mean layer 3 (L3) signaling (e.g., RRC signaling), and the dynamic signaling may mean layer 1 (L1) signaling (e.g., DCI) and/or layer 2 (L2) signaling (e.g., MAC-CE).

Furthermore, in order to support a dynamic resource triggering/activation/deactivation operation, in the NR system, a) an operation (Operation 1) of selecting one or more resource sets within M resource settings configured through higher layer signaling (e.g., L3 signaling) and/or b) an operation (Operation 2) of selecting one or more resources may be supported.

Specifically, referring to FIG. 9, Operation 1 may mean an operation of selecting one or a plurality of resource sets by taking into consideration M resource settings, S resource sets included in each resource setting, and K resources included in each resource set. Furthermore, Operation 2 may mean an operation of selecting one or a plurality of resources by taking into consideration M resource settings, S resource sets included in each resource setting, and Ks resources included in each resource set. In this case, Operation 1 may be denoted as a resource set-level selection operation, and Operation 2 may be denoted as a resource-level selection operation.

Figure 10A:
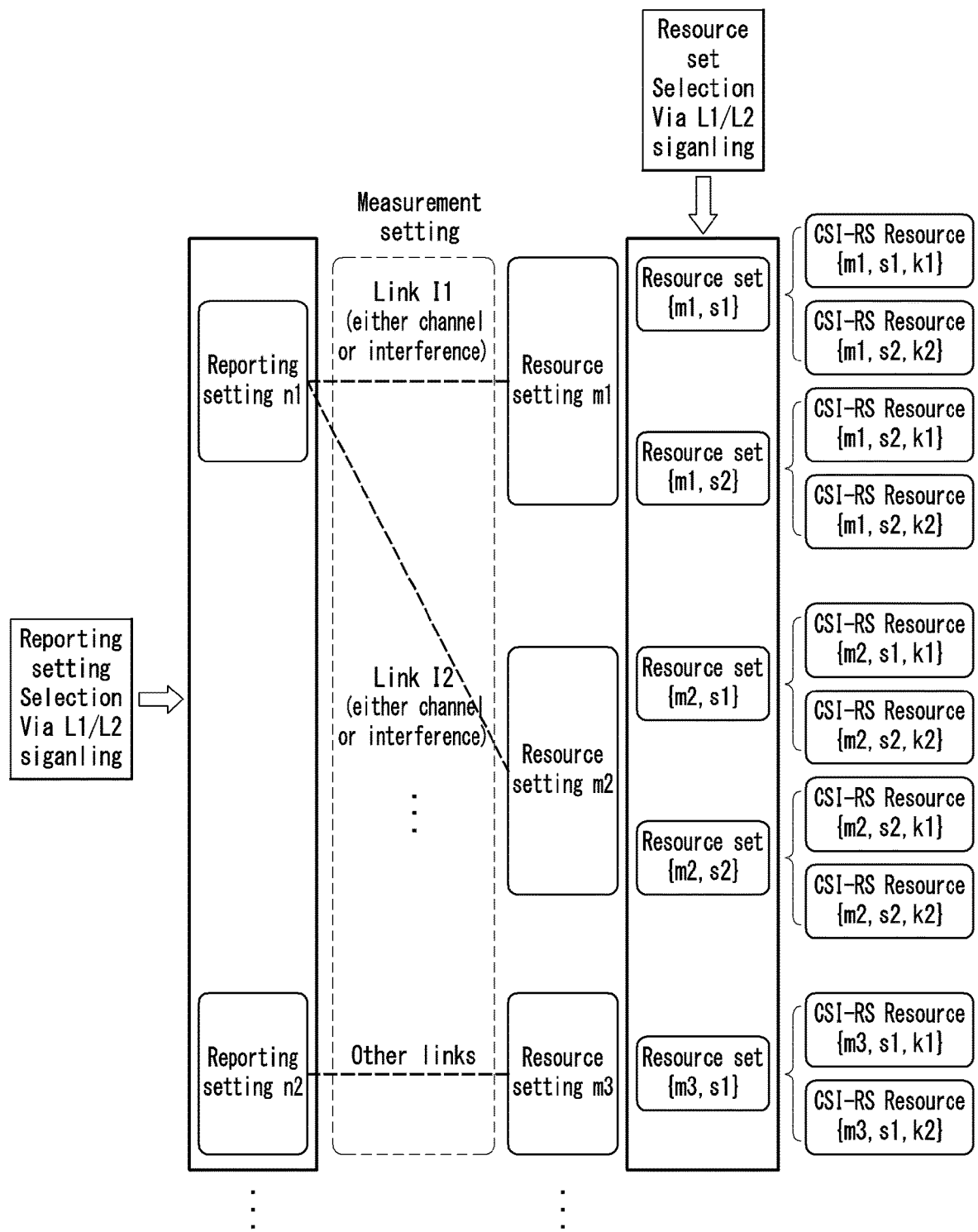
FIGS. 10A and 10B illustrate examples of a resource set or resource selection method to which a method proposed in this specification may be applied.
Figure 10B:
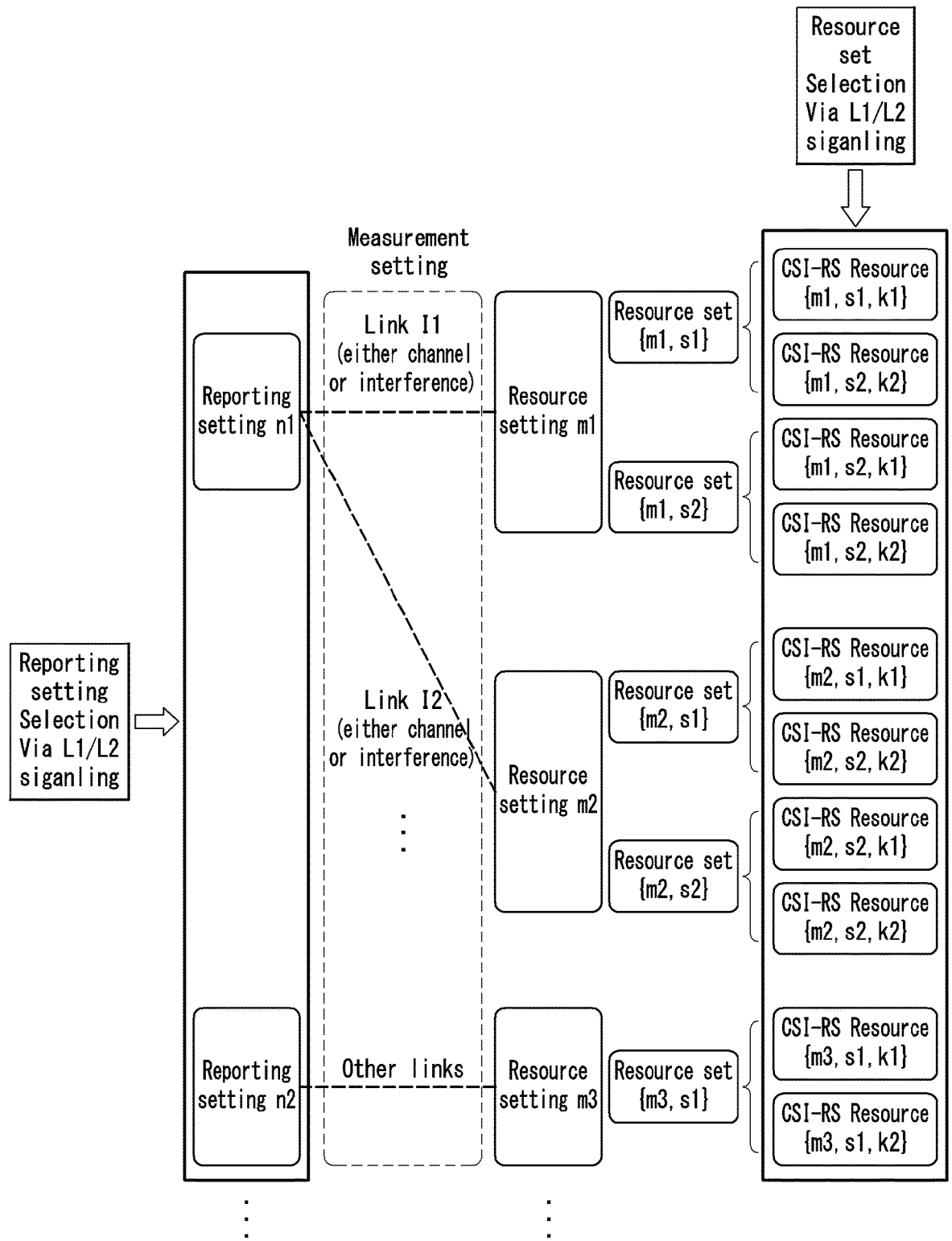

FIGS. 10A and 10B illustrate examples of a resource set or resource selection method to which a method proposed in this specification may be applied. FIGS. 10A and 10B are merely for convenience of description and does not restrict the range of the present disclosure.

Referring to FIGS. 10A and 10B, as shown in FIG. 9, it is assumed that a UE has received configuration information for a CSI framework (i.e., M resource settings, N reporting settings, and a measurement setting including configuration information for L links) from a base station through higher layer signaling (e.g., RRC signaling).

Furthermore, in FIGS. 10A and 10B, a CSI-RS resource has been illustrated, but the present disclosed is not limited thereto. The CSI-RS resource may be substituted with a resource for a downlink reference signal (DL RS) available for CSI acquisition or beam management.

FIG. 10A illustrates an operation (i.e., Operation 1) of selecting one or more resource sets through the dynamic signaling. For example, the UE may receive indication for one or more reporting settings and receive indication for one or more resource sets from a base station through L1 signaling (e.g., DCI) or L2 signaling (e.g., MAC-CE).

Furthermore, FIG. 10B illustrates an operation (i.e., Operation 2) of selecting one or more resources through the dynamic signaling. For example, the UE may receive indication for one or more reporting settings and receive indication for one or more resources from a base station through L1 signaling or L2 signaling.

FIGS. 10(a) and 10(b) illustrate that the resource set/resource selection and the reporting setting selection are independently selected for convenience of description, but may be performed through unified signaling. For example, the base station may notify the UE of a combination of the resource set (or resource) selection and the reporting setting selection using one DCI at once.

However, if methods (i.e., Operation 1 and Operation 2), such as those described in FIGS. 10A and 10B, are applied, a burden (or complexity) of dynamic signaling (e.g., L1/L2 signaling) may be increased because the number of resource sets and the number of resources configured through higher layer signaling (e.g., RRC signaling) is too many.

For example, it may be assumed that a maximum M value (i.e., a maximum number of resource settings) allowed in a system is set to 8, an S value (i.e., a maximum number of resource sets for each resource setting) is set to 4, and an Ks value (i.e., a maximum number of resources for each resource set) is set to 8. In this case, if the resource set selection according to Operation 1 is considered, a base station may indicate a resource set, selected among a maximum of 32 (32=8*4) candidates, with respect to a UE through L1 or L2 signaling. Furthermore, if the resource selection according to Operation 2 is considered, a resource selected among a maximum of 256 (256=8*4*8) candidates with respect to a UE.

Furthermore, unlike in the previous case (i.e., one selection), the number of resource sets or resources to be selected by a base station may be configured to be 2. In this case, if the resource set selection according to Operation 1 is considered, the base station needs to select a resource set among $_{32}C_2$, that is, 496 candidates. Furthermore, if the resource selection according to Operation 2 is considered, the base station needs to select a resource among $_{256}C_2$, that is, 32640 candidates.

If a base station provides indications by taking into consideration all resource sets or resources as candidates as described above, overhead of control signaling may be very great.

Accordingly, hereinafter, in this specification, various methods for reducing such control signaling overhead are described.

Specifically, this specification proposes a method of selecting a resource set (and/or resource) only within a resource group determined by implicit/explicit signaling or a specific rule when performing L1/L2 signaling for dynamic resource selection.

In this case, the resource group may mean a resource candidate(s) in which one or more resource settings, one or more resource sets and/or one or more resources are configured. That is, M resource settings, S resource sets included in each resource setting, and K resources included in each resource set may be classified into one or more groups depending on a specific property. In this case, the index of a resource set (and/or resource) within the resource group may be re-numbered.

Hereinafter, methods of configuring a resource group considered to reduce control signaling overhead are described. The resource group may be configured using each of methods described in embodiments of this specification or may be configured by combining a plurality of methods.

Hereinafter, embodiments described in this specification are divided for convenience of description, and some configurations or characteristics of any embodiment may be included in another embodiment or may be substituted with corresponding configurations or characteristics of another embodiment.

First Embodiment—Method of Configuring Resource Group Based on Time Domain Behavior Type of Reporting Setting First, a method of implicitly grouping a resource setting, a resource set and/or a resource through a parameter of a reporting setting is described.

Specifically, in the first embodiment, a method of configuring a resource group based on a parameter indicating a time-domain behavior type among parameters for reporting settings connection-established with resources (i.e., reporting setting parameters pre-configured through higher layer signaling) is described.

In this case, the resource group may be configured (or determined) by a combination of a resource and reporting supported on a system. In this case, the supported combination of a resource and reporting may be configured as in the following examples as described above. This illustrates only examples for the combination and the present disclosure is not limited thereto. The present disclosure may also be applied to various combination that have not been illustrated.

As an example of a combination of a resource and reporting, aperiodic CSI reporting may be configured along with an aperiodic/semi-persistent/periodic NZP CSI-RS for channel measurement and an aperiodic/semi-persistent/periodic ZP CSI-RS for interference measurement. Alternatively, for another example, semi-persistent CSI reporting may be configured along with a semi-persistent/periodic NZP CSI-RS for channel measurement and a semi-persistent/periodic NZP CSI-RS for interference measurement. For yet another example, periodic CSI reporting may be configured along with a periodic NZP CSI-RS for channel measurement and a periodic NZP CSI-RS for interference measurement.

That is, resource sets and/or resources may be classified into one or more groups based on a time-domain behavior type configured for reporting setting. For example, if an indicated reporting setting is a periodic reporting setting, a base station may indicate a resource in which a CSI-RS will be transmitted only within a pre-connected (or pre-configured) resource setting(s) (or resource set(s) or resource(s)) with respect to a periodic reporting setting. In this case, the resource setting(s) (or resource set(s) or resource(s)) pre-connected with respect to the periodic reporting setting may be denoted as a resource group corresponding to the periodic reporting setting.

For example, if the method is followed, M resource settings transmitted through a higher layer, S resource sets included in each resource setting and/or K resources included in each resource set may be classified into a resource group corresponding to a periodic reporting setting, a resource group corresponding to an aperiodic reporting setting, and a resource group corresponding to a semi-persistent reporting setting.

In this case, the index of the resource setting, the resource set and/or the resource may be re-numbered within each group. That is, the index of the resource setting, the index of the resource set and/or the index of the resource may be separately indexed within each group unlike in the case where it is indexed through higher layer signaling (e.g., RRC signaling).

A detailed example of the method is as follows.

For example, if a base station triggers an aperiodic resource (e.g., aperiodic RS/IMR), a resource group indicated by the base station for the selection of a UE may be configured with a resource set and/or resource(s) belonging to a resource setting(s) connection-established with an aperiodic reporting setting. In other words, in a corresponding case, the base station may indicate a resource set(s) or resource(s) within a specific resource group corresponding to an aperiodic reporting setting through L1/L2 signaling. Accordingly, the UE may select a resource set or resource within the indicated specific resource group. In this case, connection establishment between the reporting setting and the resource setting (or resource set or resource) may be performed through higher layer signaling (e.g., RRC signaling).

For another example, if a base station activates or deactivates a semi-persistent resource (e.g., a semi-persistent CSI-RS), a resource group indicated by the base station for the selection of a UE may be configured with a resource set and/or resource(s) belonging to a resource setting(s) connection-established with an aperiodic reporting setting and/or a semi-persistent reporting setting. In other words, in a corresponding case, the base station may indicate a resource set(s) or specific resource(s) through L1/L2 signaling within a specific resource group corresponding to an aperiodic reporting setting and/or a semi-persistent reporting setting. Accordingly, the UE may select a resource set or resource within the indicated specific resource group. Even in this case, connection establishment between the reporting setting and the resource setting (or resource set or resource) may be performed through higher layer signaling (e.g., RRC signaling).

In this case, the base station may transmit a message for selection indication for the reporting setting and a message for selection indication for the resource set or resource through one signaling, or may transmit each of the messages through each signaling. For example, the base station may transmit the messages together through any one of L1 signaling (e.g., DCI) or L2 signaling (e.g., MAC-CE). Alternatively, the base station may transmit the message for selection indication for a reporting setting through L2 signaling and transmit the message for selection indication for a resource set or resource through L1 signaling, and vice versa.

The method proposed in the first embodiment may be usefully used if an aperiodic resource selection message and a semi-persistent resource selection message are divided implicitly or explicitly.

For example, if a base station is configured to indicate aperiodic resource selection through DCI and indicate semi-persistent resource selection through a MAC-CE, a UE may implicitly divide two types of resource selection types. That is, in a corresponding example, when resource selection information is received through DCI, a corresponding UE may recognize the received information as information related to aperiodic resource selection. In contrast, when resource selection information is received through a MAC-CE, a corresponding UE may recognize the received information as information related to semi-persistent resource selection.

Second Embodiment—Method of Configuring Resource Group Based on Resource-Related Parameter A method of grouping resource settings, resource sets and/or resources based on a resource-related parameter is described below.

Specifically, in the second embodiment, a method of (implicitly) configuring a resource group based on the usage (e.g., channel measurement, interference measurement or PDSCH rate matching) of a corresponding resource designated by a resource type, a resource property and/or a measurement setting is described. In this case, a resource-related parameter available for the resource group configuration may mean a parameter included in a resource setting configured through higher layer signaling (e.g., RRC signaling).

That is, M resource settings, S resource sets included in each resource setting and/or K resources included in each resource set configured through higher layer signaling may be classified into a plurality of resource groups based on a parameter value set for each resource.

In the case of the method, there is an advantage in that a base station does not need to transmit a group indicator through explicit signaling. That is, if the corresponding method is applied, a resource group(s) may be configured through an indicator related to the type, characteristic and/or usage of a corresponding resource without a separate group indicator.

Detailed examples of the method are as follows.

For example, a resource group may be configured based on a resource type according to a time-domain behavior. Specifically, a plurality of resource settings, a plurality of resource sets and/or a plurality of resources may be classified into an aperiodic resource group, a periodic resource group, or a semi-persistent resource group.

For another example, a resource group may be configured based on a resource type according to a use case in which a corresponding resource is used. Specifically, a plurality of resource settings, a plurality of resource sets and/or a plurality of resources may be classified into a resource group for beam management (e.g., CSI-RS for BM) or a resource group for CSI acquisition (e.g., CSI-RS for CSI acquisition).

For yet another example, a resource group may be configured based on a resource type according to the type of reference signal. Specifically, a plurality of resource settings, a plurality of resource sets and/or a plurality of resources may be classified into a resource group corresponding to a CSI-RS, a resource group corresponding to an MRS, or a resource group corresponding to a BRS.

For yet another example, a resource group may be configured based on a resource type according to power configured in a resource. Specifically, a plurality of resource settings, a plurality of resource sets and/or a plurality of resources may be classified into a resource group corresponding to zero-power (ZP) (e.g., ZP CSI-RS) or a resource group corresponding to non-zero-power (NZP) (e.g., NZP CSI-RS).

Furthermore, a resource group may be configured by combining the methods described in the examples.

For example, a resource group may be configured by taking into consideration a time-domain behavior type, a method in which a corresponding resource is used and power configured in a corresponding resource together. Specifically, a plurality of resource settings, a plurality of resource sets and/or a plurality of resources configured through higher layer signaling may be classified into the following resource groups.

An aperiodic ZP CSI-RS for interference measurement (aperiodic ZP CSI-RS for IM)

An aperiodic NZP CSI-RS for interference measurement (aperiodic NZP CSI-RS for IM)

An aperiodic NZP CSI-RS for channel measurement (aperiodic NZP CSI-RS for CM)

A semi-persistent ZP CSI-RS for interference measurement (semi-persistent ZP CSI-RS for IM)

A semi-persistent NZP CSI-RS for interference measurement (semi-persistent NZP CSI-RS for IM)

A semi-persistent NZP CSI-RS for channel measurement (semi-persistent NZP CSI-RS for CM)

A periodic ZP CSI-RS for interference measurement (periodic ZP CSI-RS for IM)

A periodic NZP CSI-RS for interference measurement (periodic NZP CSI-RS for IM)

A periodic NZP CSI-RS for channel measurement (periodic NZP CSI-RS for CM)

The example is only an example of a combination of resource types and the present disclosure is not limited thereto. Resource groups may be configured by taking into consideration a combination of various resource types.

Third Embodiment—Method of Configuring Resource Group Based on Link Property

A method of configuring a resource group based on the attribute parameter of each link set up through a measurement setting with respect to a resource is described below.

Specifically, in the third embodiment, a method of configuring a resource group based on a parameter (e.g., "Quantity to be measured") indicating the usage of a link set up with respect to a corresponding resource is described.

For example, a link set up for each resource may be configured for a channel estimation (i.e., channel measurement) or interference estimation usage. In this case, a base station may indicate the usage of the link with respect to a UE using a parameter indicating the property of each link. Furthermore, the base station may additionally transmit information, representing whether a corresponding resource is used as the rate-matching usage of a PDSCH (i.e., data), to the UE using the parameter.

In this case, the same resource setting may be configured for a plurality of reporting settings, and the corresponding resource setting may be configured to be used as a different usage for each reporting setting. For example, a specific resource setting may be configured as a resource for channel measurement with respect to a first reporting setting, and may be configured as a resource for interference measurement with respect to a second reporting setting.

Accordingly, if the method is used, a resource set and/or resource redundant between configured resource groups may be present.

Fourth Embodiment—Method of Configuring Resource Group Based on Indication of Base Station A method of configuring a resource group based on an indicator transmitted by a base station is described below.

Specifically, in the fourth embodiment, a method of configuring a resource group based on an indicator for a reporting setting(s), an indicator for a link(s) and/or a resource-related indicator indicated by a base station is described. In this case, the resource-related indicator may mean an indicator for a resource(s), a resource set(s) and/or a resource group(s).

Detailed examples of the method are as follows.

For example, if a base station transmits an indicator for a reporting setting(s) to a UE, the corresponding UE may select a resource to be used for CSI reporting only within a resource set(s) or resource(s) connection-established with an indicated reporting setting(s).

For another example, if a base station transmits an indicator for a link(s) to a UE, the corresponding UE may select a resource to be used for CSI reporting only within a resource set(s) or resource(s) connection-established with the indicated link(s).

For yet another example, if a base station transmits an indicator for a resource set(s), a corresponding UE may select a resource to be used for CSI reporting only within the indicated resource set(s).

For yet another example, if a base station transmits an indicator for a resource(s), a corresponding UE may select a resource to be used for CSI reporting only within the indicated resource(s).

In this case, the base station may transmit the indicators (i.e., signaling information) through a message in the same layer as that of resource-related control information, or may transmit the indicators through a message of a higher layer.

In this case, the resource-related control information may mean control information for enabling the base station to trigger, activate or deactivate a resource. For example, the indicators may be transmitted through L1 signaling (e.g., DCI) like control information or may be transmitted through L2 signaling (e.g., MAC-CE), that is, a higher layer than the control information.

Furthermore, the base station may transmit the indicators (i.e., designation information for the reporting setting, link, resource set, or resource) in the same slot as that of the resource-related control information or a slot previous to the slot of the resource-related control information. In this case, the slot indicates a transmission unit and is not limited thereto, and may be substituted with a different time unit (e.g., subframe or transmission time interval).

If a base station transmits the indicators in a previous slot, a method in which information according to the indicators defines a valid range (e.g., N slot/msec) may be taken into consideration. In this case, a criterion for the valid range may be set as timing in which a UE receives resource-related control information.

For example, if the UE receives the indicators prior to the valid range based on timing in which the UE receives the resource-related control information, the corresponding UE may determine that an indicated (or designated) reporting setting, link, resource set or resource is valid as information for selecting a CSI reporting resource. In contrast, if the UE receives the indicators after the valid range based on timing in which the UE receives the resource-related control information, the corresponding UE may be configured to neglect an indicated (or designated) reporting setting, link, resource set or resource.

Furthermore, the identity (ID) of the reporting setting, link, resource set and/or resource may not be numbered based on the absolute number of reporting settings, the number of links, the number of resource sets and/or the number of resources pre-configured in a UE. That is, the index of a reporting setting, the index of a link, the index of a resource set or the index of a resource indicated by a base station may be configured differently from an index pre-configured in a UE through higher layer signaling.

For example, in embodiments of this specification, the indices may be re-numbered (or re-indexed) within a pre-determined candidate group (i.e., a candidate group for a reporting setting, link, resource set or resource) by applying the proposed methods together. In this case, the pre-determined candidate group may be configured based on a combination supported on a system, signaling by a base station and/or the type (or characteristic) of a resource. In other words, the index of a reporting setting, link, resource set or resource may be re-configured within the pre-determined candidate group.

Furthermore, a method of transmitting, by a base station, information for a resource group to a UE through higher layer signaling (e.g., L2/L3 signaling) may also be taken into consideration. For example, a base station may transmit, to a UE, a resource group index configured in a resource setting, resource set or resource unit through a RRC message or a MAC-CE message. Thereafter, the base station may indicate a specific resource group index (or specific resource group identity) through separate signaling (e.g., L1/L2 signaling) with respect to the UE. Accordingly, the corresponding UE may be configured (or indicated) to select a resource to be used for CSI reporting only within a resource group corresponding to the specific resource group index.

In this case, the separate signaling may be performed in the same layer as signaling used for information for the group or may be performed in a lower layer. For example, a base station may transmit information for the resource group through RRC signaling, and may transmit information representing the specific resource group index through a MAC-CE. Thereafter, the base station may indicate that a UE should select a resource set or resource only within a resource group indicated through the MAC-CE using DCI.

Fifth Embodiment—Method of Configuring Resource Group Based on Control Signaling Resource A method of implicitly indicating a resource group through a DL resource location and/or format for control signaling is described below.

Specifically, a resource(s) to be used for CSI reporting may be configured based on the time/frequency location, format and/or property of a PDCCH or PDSCH resource in which control information dynamically indicating resource set or resource selection is transmitted. For example, the PDCCH may correspond to a case where the information is transmitted through DCI. The PDSCH may correspond to a case where the control information is transmitted through a MAC-CE.

In this case, a method of pre-configuring a resource group(s) based on a time resource (e.g., slot, subframe or symbol) and indicating a resource group through a specific time resource in which the control information is transmitted may be taken into consideration. For example, a base station may pre-configure a resource group mapped to each slot index or slot set and may (implicitly) indicate a resource group through a slot index in which DCI or a MAC-CE is transmitted.

In other words, a base station may pre-configure a resource group, corresponding to each slot index or each slot set, through higher layer signaling (e.g., RRC signaling) with respect to a UE, and may transmit control information indicating a resource set or resource selection in a specific slot. The UE that has received the control information may confirm that the control information has been transmitted through which slot index or which slot set, and may identify a resource group implicitly indicated through a corresponding location.

Alternatively, a method of pre-configuring a resource group(s) based on a frequency resource (e.g., resource block group (RBG), resource block (RB) or subcarrier) and indicating a resource group through a specific frequency resource in which the control information is transmitted may also be taken into consideration. For example, a base station may pre-configure a resource group in an RBG unit, and may (implicitly) indicate a resource group through the location of a resource block group (RBG) in which DCI or a MAC-CE is transmitted.

In other words, a base station may pre-configure a resource group, corresponding to each resource block group, with respect to a UE through higher layer signaling (e.g., RRC signaling), and may transmit control information indicating a resource set or resource selection in a specific RBG. The UE that has received the control information may confirm that the control information has been transmitted through which RBG, and may identify a resource group implicitly indicated through a corresponding location.

Alternatively, a method of configuring (or mapping) a resource group for each format (e.g., DCI the format) of the control information and/or each search space (e.g., UE-specific search space or cell-specific search space) configured for the control information may also be taken into consideration. In this case, a UE may confirm the format and/or search space of the control information received from a base station, and may identify an implicitly indicated resource group.

Furthermore, the embodiments of the present disclosure may be performed independently, but a method of configuring a resource group by applying methods described in a plurality of embodiments together may be taken into consideration.

For example, a method of designating a resource group within candidate resources primarily selected by a combination of a resource and reporting supported on a system described in the first embodiment through the indication (i.e., implicit or explicit signaling) of a base station described in the fourth embodiment may be taken into consideration.

For another example, resource grouping based on a resource setting parameter, a measurement setting parameter and/or a reporting setting parameter may be primarily performed by applying the methods described in the first embodiment, the second embodiment, and the third embodiment together. Thereafter, the final resource group may be configured (or determined) based on the indication of a network (i.e., base station) by applying the methods described in the fourth embodiment and/or the fifth embodiment.

Furthermore, the implicit or explicit signaling information may be transmitted through a hierarchical signaling method in order to reduce signaling overhead. In this case, the hierarchical signaling method may mean a method of reducing the final signaling payload because a candidate group (e.g., candidate set) is indicated using a message of a layer higher than a layer in which the final signaling is performed. In this case, two-step signaling or three-step signaling may be taken into consideration as the hierarchical signaling method.

As an example of the two-step signaling, a base station may transmit configuration information (e.g., resource group configuration information or CSI configuration information) for a candidate group to a UE through L3 signaling (e.g., RRC signaling), and may indicate a specific candidate (e.g., specific resource group) within the candidate group through L1 or L2 signaling (e.g., MAC-CE or DCI). Furthermore, as another example of the two-step signaling, a base station may transmit configuration information (e.g., resource group configuration information, CSI configuration information) for a candidate group to a UE through L2 signaling (e.g., MAC-CE), and may indicate a specific candidate (e.g., specific resource group) within the candidate group through L1 signaling (e.g., DCI).

Furthermore, as an example of the three-step signaling, a base station may transmit configuration information (e.g., resource group configuration information, CSI configuration information) for a first candidate group to a UE through L3 signaling (e.g., RRC signaling). Thereafter, the base station may transmit, to the UE, configuration information (e.g., sub resource group configuration information) for a second candidate group (i.e., a candidate group having a smaller number of candidates than the first candidate group) configured within the first candidate group through L2 signaling (e.g., MAC-CE). Finally, the base station may indicate a specific candidate (e.g., specific resource group) within the corresponding second candidate group through L1 signaling (e.g., DCI).

Figure 11:
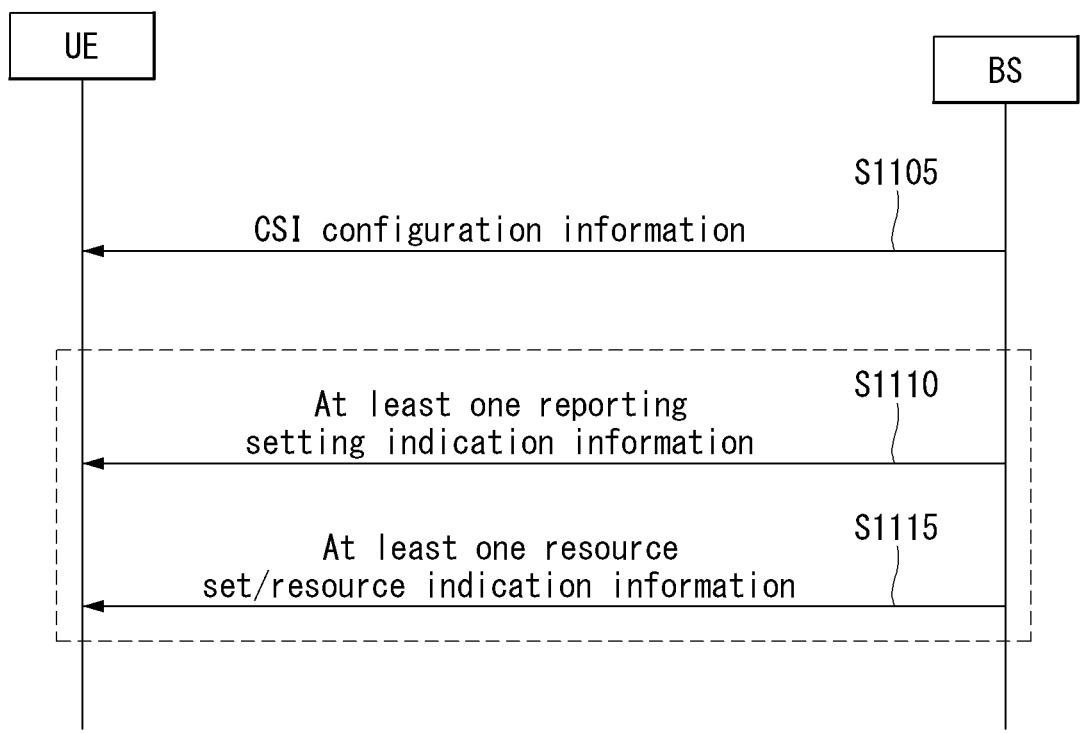
FIG. 11 shows a flowchart of a UE operation in a procedure of reporting CSI to which a method proposed in this specification may be applied.

FIG. 11 shows a flowchart of a UE operation in a procedure of reporting CSI to which a method proposed in this specification may be applied. FIG. 11 is merely for convenience of description and does not restrict the range of the present disclosure.

Referring to FIG. 11, a case where a corresponding UE performs CSI measurement and reporting based on a CSI framework and considers a resource, belonging to a specific resource group, for CSI measurement and reporting in order to reduce control overhead of L1 or L2 signaling is assumed.

At step S1105, the UE may receive, from a base station, CSI configuration information related to a CSI reporting procedure. In this case, the CSI configuration information may mean configuration information for the CSI framework. That is, as shown in FIG. 9, the CSI configuration information may include information representing one or more measurement settings, information representing a plurality of reporting settings and information representing a plurality of resource settings.

For example, the UE may receive, from the base station, configuration information for one measurement setting (including a setting for L links), M resource settings, and N reporting settings related to CSI measurement and reporting through RRC signaling.

At step S1110, the UE may receive, from the base station, reporting information representing at least one of the plurality of reporting settings. In other words, as described above, the base station may trigger, activate or deactivate at least one reporting setting through the reporting information with respect to the UE. For example, the reporting information may be transmitted through any one of L1 signaling (e.g., DCI) or L2 signaling (e.g., MAC-CE).

At step S1115, the UE may receive resource information representing at least one resource set or at least one resource belonging to a specific resource group related to the at least one reporting setting. In other words, as in the method, the base station may indicate that the UE should select a resource for CSI measurement and reporting only within a specific resource group related to the at least one reporting setting. For example, the resource information may be transmitted through any one of L1 signaling (e.g., DCI) or L2 signaling (e.g., MAC-CE).

In this case, the specific resource group may be configured based on an operation mode on a time domain (e.g., aperiodic CSI reporting, periodic CSI reporting or semi-persistent CSI reporting) configured for the at least one reporting setting within the plurality of resource settings. That is, as described above, resources (or resource sets) included in the plurality of resource settings may be classified into a resource group corresponding to an aperiodic CSI reporting, a resource group corresponding to a periodic CSI reporting and/or a resource group corresponding to semi-persistent CSI reporting.

In this case, step S1110 and step S1115 may be performed simultaneously. That is, the reporting information and the resource information may be transmitted through one message (e.g., DCI or MAC-CE).

Furthermore, as described above, the specific resource group may be one of resource groups configured by combining the plurality of reporting settings and the plurality of resource settings. Specifically, according to the embodiments of the present disclosure, the resource groups may be configured based on a combination between an operation mode on a time domain configured for each reporting setting and an operation mode on a time domain configured for each resource setting.

Furthermore, as described above, the index of the at least one resource set or the index of the at least one resource belonging to the specific resource group may be re-numbered (i.e., re-indexed) within the specific resource group.

Furthermore, if the base station is configured to trigger an aperiodic resource for CSI reporting, the specific resource group may include at least one resource setting pre-configured for the aperiodic CSI reporting, among the plurality of resource settings. In this case, the at least one resource setting pre-configured for the aperiodic CSI reporting may include at least one resource set or resource pre-configured for the aperiodic CSI reporting. In contrast, if the base station is configured to activate or deactivate a semi-persistent resource for CSI reporting, the specific resource group may include at least one of at least one resource setting for the aperiodic CSI reporting included in the plurality of resource settings or at least one resource setting for the semi-persistent CSI reporting included in the plurality of resource settings.

Furthermore, the specific resource group may be configured by additionally taking into consideration an attribute parameter for each of the plurality of resource settings. For example, as described in the second embodiment, the specific resource group may be configured by taking into consideration the type, property and/or usage of a corresponding resource (or resource setting or resource set).

Furthermore, the specific resource group may be configured by additionally taking into consideration a parameter indicating the usage (e.g., for channel measurement, for interference measurement and/or for rate matching) of a link between a reporting setting and a resource setting. In this case, the parameter indicating the usage of the link may be included in the one or more measurement settings.

Overview of Devices to which the Present Disclosure May be Applied

Figure 12:
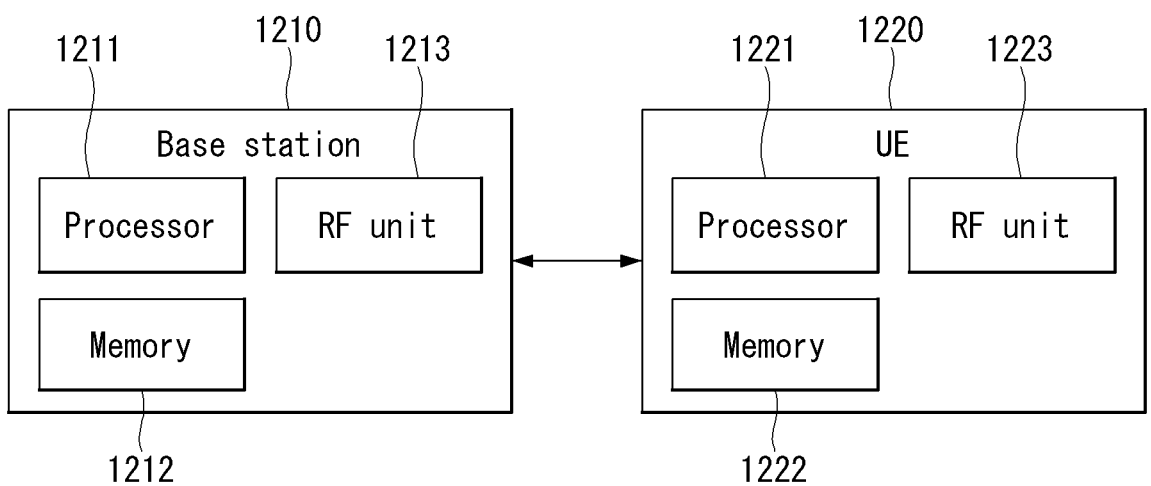
FIG. 12 illustrates a block diagram of a wireless communication device according to an embodiment of the present disclosure.

FIG. 12 illustrates a block diagram of a wireless communication device according to an embodiment of the present disclosure.

Referring to FIG. 12, a wireless communication system includes a base station (or network) 1210 and a UE 1220.

The base station 1210 includes a processor 1211, a memory 1212, and a communication module 1213.

The processor 1211 implements a function, a process, and/or a method which are proposed in FIGS. 1 to 11 above. Layers of a wired/wireless interface protocol may be implemented by the processor 1211. The memory 1212 is connected with the processor 1211 to store various pieces of information for driving the processor 1211. The communication module 1213 is connected with the processor 1211 to transmit and/or receive a wired/wireless signal.

The communication module 1213 may include a radio frequency (RF) unit for transmitting/receiving a radio signal.

The UE 1220 includes a processor 1221, a memory 1222, and a communication module (or RF unit) 1223. The processor 1221 implements a function, a process, and/or a method which are proposed in FIGS. 1 to 11 above. The layers of the wireless interface protocol may be implemented by the processor 1221. The memory 1222 is connected with the processor 1221 to store various pieces of information for driving the processor 1221. The communication module 1223 is connected with the processor 1221 to transmit and/or receive the wireless signal.

The memories 1212 and 1222 may be positioned inside or outside the processors 1211 and 1221 and connected with the processors 1211 and 1221 by various well-known means.

Further, the base station 1210 and/or the UE 1220 may have a single antenna or multiple antennas.

Figure 13:
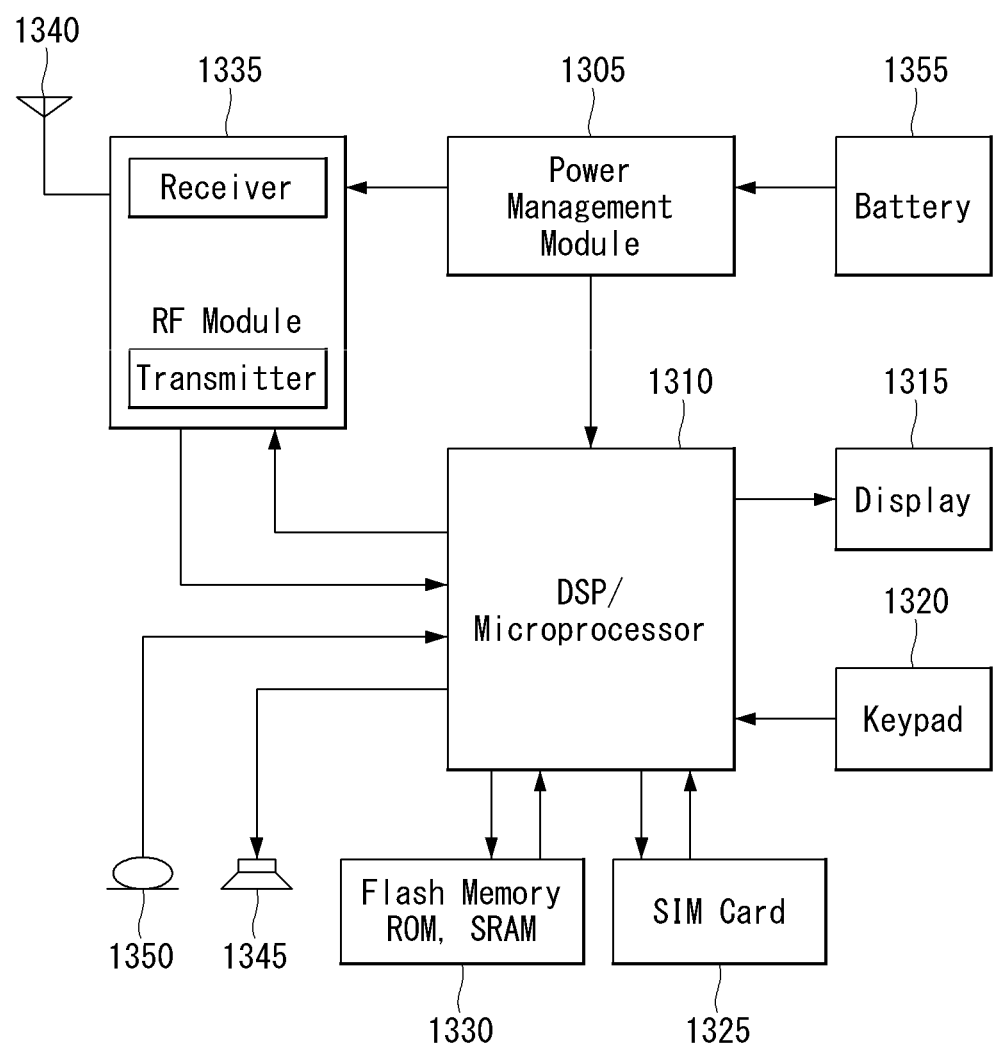
FIG. 13 illustrates a block diagram of a communication device according to an embodiment of the present disclosure.

FIG. 13 illustrates a block diagram of a communication device according to an embodiment of the present disclosure.

In particular, FIG. 13 is a diagram more specifically illustrating the UE of FIG. 12.

Referring to FIG. 13, the UE may be configured to include a processor (or a digital signal processor (DSP) 1310, an RF module (or RF unit) 1335, a power management module 1305, an antenna 1340, a battery 1355, a display 1315, a keypad 1320, a memory 1330, a subscriber identification module (SIM) card 1325 (this component is optional), a speaker 1345, and a microphone 1350. The UE may also include a single antenna or multiple antennas.

The processor 1310 implements a function, a process, and/or a method which are proposed in FIGS. 1 to 11 above. Layers of a wireless interface protocol may be implemented by the processor 1310.

The memory 1330 is connected with the processor 1310 to store information related to an operation of the processor 1310. The memory 1330 may be positioned inside or outside the processor 1310 and connected with the processor 1310 by various well-known means.

A user inputs command information such as a telephone number or the like by, for example, pressing (or touching) a button on the keypad 1320 or by voice activation using the microphone 1350. The processor 1310 receives such command information and processes to perform appropriate functions including dialing a telephone number. Operational data may be extracted from the SIM card 1325 or the memory 1330. In addition, the processor 1310 may display command information or drive information on the display 1315 for the user to recognize and for convenience.

The RF module 1335 is connected with the processor 1310 to transmit and/or receive an RF signal. The processor 1310 transfers the command information to the RF module 1335 to initiate communication, for example, to transmit radio signals constituting voice communication data. The RF module 1335 is constituted by a receiver and a transmitter for receiving and transmitting the radio signals. The antenna 1340 functions to transmit and receive the radio signals. Upon receiving the radio signals, the RF module 1335 may transfer the signal for processing by the processor 1310 and convert the signal to a baseband. The processed signal may be converted into to audible or readable information output via the speaker 1345.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

INDUSTRIAL APPLICABILITY

Although the method for measuring and reporting channel state information in the wireless communication system of the present disclosure has been described with reference to an example applied to a 3GPP LTE/LTE-A system or a 5G system, the method may be applied to various wireless communication systems in addition to the 3GPP LTE/LTE-A system or 5G system.

The invention claimed is:

1. A method of performing, by a user equipment, channel state information (CSI) reporting in a wireless communication system, the method comprising:
   receiving, from a base station, CSI configuration information related to the CSI reporting, wherein each of a plurality of reporting settings included in the CSI configuration information is configured in association with one or more resource sets;
   receiving, from the base station, information representing i) a specific reporting setting among the plurality of reporting settings and ii) a specific resource set associated with the specific reporting setting; and
   performing the CSI reporting based on the specific reporting setting and the specific resource set,
   wherein each index of at least one resource set related with the specific reporting setting is re-numbered based on the specific reporting setting.

2. The method of claim 1,
   wherein the one or more resource sets are configured based on an operation mode on a time domain of a corresponding reporting setting, and
   wherein the operation mode on the time domain is any one of periodic CSI reporting, aperiodic CSI reporting, or semi-persistent CSI reporting.

3. The method of claim 2,
   wherein based on the base station being configured to trigger an aperiodic resource for the CSI reporting, the one or more resource sets comprise at least one resource setting pre-configured for the aperiodic CSI reporting among a plurality of resource settings related to the CSI reporting.

4. The method of claim 2,
   wherein based on the base station being configured to activate or deactivate a semi-persistent resource for the CSI reporting, the one or more resource sets comprise at least one of (i) at least one resource setting for the aperiodic CSI reporting or (ii) at least one resource setting for the semi-persistent CSI reporting, which is included in a plurality of resource settings related to the CSI reporting.

5. The method of claim 1,
   wherein the CSI configuration information is received through radio resource control (RRC) signaling, and
   wherein the information representing the specific reporting setting and the specific resource set is received through downlink control information (DCI).

6. The method of claim 5,
   wherein the specific reporting setting and the specific resource set are indicated based on one DCI simultaneously.

7. The method of claim 1,
   wherein the one or more resource sets are based on at least one resource setting related to the CSI reporting.

8. The method of claim 7,
   wherein the one or more resource sets are configured based on a combination between an operation mode on a time domain configured for each reporting setting and an operation mode on a time domain configured for each resource setting.

9. A user equipment configured to perform channel state information (CSI) reporting in a wireless communication system, the user equipment comprising:
   a transceiver;
   at least one processor; and
   at least one computer memory operatively connected to the at least one processor and storing instructions that, based on being executed by the at least one processor, perform operations that comprise:
   receiving, from a base station, CSI configuration information related to the CSI reporting, wherein each of a plurality of reporting settings included in the CSI configuration information is configured in association with one or more resource sets;
   receiving, from the base station, information representing i) a specific reporting setting among the plurality of reporting settings and ii) a specific resource set associated with the specific reporting setting; and
   performing the CSI reporting based on the specific reporting setting and the specific resource set,
   wherein each index of at least one resource set related with the specific reporting setting is re-numbered based on the specific reporting setting.

10. The user equipment of claim 9,
    wherein the CSI configuration information is received through radio resource control (RRC) signaling, and
    wherein the information representing the specific reporting setting and the specific resource set is received through downlink control information (DCI).

11. The user equipment of claim 10,
    wherein the specific reporting setting and the specific resource set are indicated based on one DCI simultaneously.

12. The user equipment of claim 9,
    wherein the one or more resource sets are based on at least one resource setting related to the CSI reporting.

13. The user equipment of claim 9,
    wherein the one or more resource sets are configured based on an operation mode on a time domain of a corresponding reporting setting, and
    wherein the operation mode on the time domain is any one of periodic CSI reporting, aperiodic CSI reporting, or semi-persistent CSI reporting.

14. A processing device configured to control a user equipment to perform channel state information (CSI) reporting in a wireless communication system, the processing device comprising:
- at least one processor; and
- at least one computer memory operatively connected to the at least one processor and storing instructions that, based on being executed by the at least one processor, perform operations that comprise:
  - receiving, from a base station, CSI configuration information related to the CSI reporting, wherein each of a plurality of reporting settings included in the CSI configuration information is configured in association with one or more resource sets;
  - receiving, from the base station, information representing i) a specific reporting setting among the plurality of reporting settings and ii) a specific resource set associated with the specific reporting setting; and
  - performing the CSI reporting based on the specific reporting setting and the specific resource set,
  - wherein each index of at least one resource set related with the specific reporting setting is re-numbered based on the specific reporting setting.

15. The processing device of claim 14,
wherein the CSI configuration information is received through radio resource control (RRC) signaling, and
wherein the information representing the specific reporting setting and the specific resource set is received through downlink control information (DCI).

16. The processing device of claim 15,
wherein the specific reporting setting and the specific resource set are indicated based on one DCI simultaneously.

17. The processing device of claim 14,
wherein the one or more resource sets are based on at least one resource setting related to the CSI reporting.

18. The processing device of claim 14,
wherein the one or more resource sets are configured based on an operation mode on a time domain of a corresponding reporting setting, and
wherein the operation mode on the time domain is any one of periodic CSI reporting, aperiodic CSI reporting, or semi-persistent CSI reporting.

* * * * *